United States Patent [19]

Joel, Jr.

[11] Patent Number: 4,736,462
[45] Date of Patent: Apr. 5, 1988

[54] PHOTONIC SWITCHING

[75] Inventor: Amos E. Joel, Jr., South Orange, N.J.

[73] Assignee: American Telephone and Telegraph Company, AT&T Bell Laboratories, Murray Hill, N.J.

[21] Appl. No.: 841,849

[22] Filed: Mar. 20, 1986

[51] Int. Cl.⁴ .............................................. H04B 9/00
[52] U.S. Cl. .............................................. 455/600
[58] Field of Search ....................... 455/600, 607, 612; 350/96.13, 96.14

[56] References Cited

U.S. PATENT DOCUMENTS 3,849,604 11/1974 Benes et al. ............................ 179/15

FOREIGN PATENT DOCUMENTS 2139443 11/1984 United Kingdom ................. 455/600

OTHER PUBLICATIONS

Ogiwara et al.-Optical Switching System Equipment-IEEE Trans. on Communications-vol. Com 27, #2, Feb. 1979, pp. 517-521.
S. Kobayashi et al., "Semiconductor Optical Amplifiers", IEEE Spectrum, vol. 21, No. 5, May 1984, pp. 26-33.
A. E. Joel, Jr., "On Permutation Switching Networks", The Bell System Technical Journal, vol. 47, 1968, pp. 813-822.
R. C. Alferness, "High-Speed Optical Switches for Single-Mode Lightwave Communications", IEEE Global Telecommunications Conference, (Atlanta), Nov. 26-29, 1984, pp. 874-877.
H. S. Hinton, "A Nonblocking Optical Interconnection Network Using Directional Couplers", IEEE Global Telecommunications Conference, (Atlanta), Nov. 26-29, 1984, pp. 885-889.

Primary Examiner—Joseph A. Orsino, Jr.
Attorney, Agent, or Firm—Werner Ulrich

[57] ABSTRACT

A method and apparatus are disclosed for implementing an optical communication network wherein switchable information signals are retained in the optical mode. Sources of optical signals, destinations for optical signals, and intermediate photonic switches are interconnected by optical links, each link comprising two unidirectional transmission optical fibers. An optical bit stream generated at a source of optical signals comprises repetitive time frames. Each time frame includes a frame synchronizing signal and a plurality of signal groups of information bits separated in time by a route switching interval. The optical bit streams entering a photonic switch are frame synchronized. A particular group of information bits retains its position in time within a frame from the source of the optical signal to its destination. The photonic switch is set up during a route switching interval for transmission of a group of information bits from an input to an output of the photonic switch. Advantageously, in such a network optical signals need not be converted to electrical signals as they traverse communication links from a source to a destination.

62 Claims, 9 Drawing Sheets

PHOTONIC SWITCHING

TECHNICAL FIELD

This invention relates to communications networks facilities utilizing transmission in the optical domain.

BACKGROUND OF THE INVENTION

Optical transmission systems are becoming increasingly prevalent in modern telecommunication networks. They offer the advantages of a low cost wideband transmission medium requiring amplification at relatively long spacing and support a very large number of simultaneous communications over each of the optical fibers that constitute the transmission medium. Voice, data, and video are communicated as digital signals over the optic fibers to minimize noise and distortion of the signals over long distance transmission.

A problem in the prior art exists in that while optical transmission systems can carry large numbers of separate communications, no satisfactory method exists for inserting and removing selected communications at a node in a transmission network, or switching selected communications from one optical fiber to another, without converting the signals into electrical signals, processing the electrical signals at a slower rate, and reconverting them into high speed optical signals.

SUMMARY OF THE INVENTION

The above problem is solved and a technical advance is achieved in accordance with the principles of the invention illustratively in an optical communication transmission network by a method and structural arrangement in which information signals are grouped by destination and are separated by route switching intervals during which photonic switching occurs concurrently to communicate the signal groups illustratively from a plurality of incoming optical fiber links to a plurality of outgoing optical fiber links without the need for information signal conversion from the optical domain. Each information signal group represents a multiplicity of separate communications having a common destination.

A technical advance is that the optical information signals appearing on optical fiber links are frame synchronized to permit the signals to be photonically switched from one such optical fiber to another without requiring buffering for photonic switch operations. Each group of information signals comprises a group of time slots each of which contains a signal for one communication. A route switching interval is illustratively inserted between adjacent information signal groups of time slots. At any time during such a switching interval, a new path can be set up in the photonic switch without losing information signals. Illustratively, if an optical signal contains adjacent signal groups for two destinations, and both signal groups are switched to a common path in a first photonic switch and are switched to separate paths in a second photonic switch, a route switching interval is inserted between the two signal groups, transmitted transparently through the first switch, and used as a route switching interval in the second switch. Advantageously, this allows a time interval equal to the duration of the route switching interval for making a transition subsequently to switch a group of information signals and to allow for tolerances in the accuracy of frame synchronization between signals on different optical links.

A recurrent synchronization signal is illustratively sent with each time frame which comprises a plurality of the information signal groups and route switching intervals. The frame synchronization signal is arranged to be easily recognized with a minimum of signal processing. The signal is used as a basic timing signal to fix when the information signals associated with a group of time slots are to be switched between one optical fiber and another, or to be removed from an optical fiber for communication via an electrical link to destinations for electrical digital communication signals.

A processor for a node of a photonic switch network controls the synchronization of frames of information signals and route switching intervals among a plurality of incoming optical fibers and to a plurality of outgoing optical fibers. It does so by interprocessor communication of frame synchronization delay messages toward upstream optical information signal stream generating points in the networks. Such an arrangement permits incoming signals from separate fibers to be in frame synchronism so that corresponding groups of time slots may be switched between optical fibers with minimal buffering.

Optical buffering or electrical buffering is inserted in one or both directions of the optical fiber links joining two photonic switches where both ends of an optical link cannot meet a frame synchronism requirement. Such buffering in appropriate links achieves a flexible optical network topology while permitting switching between optical fibers to take place without further signal processing and without conversion to the electric domain for the photonic switching.

A central processor for the entire photonic switch network allocates destinations to each of the time slot groups for all of the optical fiber links. Such an arrangement permits a global optimization of the use of time slot groups over the network.

Accordingly, an optical communication arrangement is provided comprising an optical bit stream with periodic frames of signal groups, wherein each signal group comprises a plurality of time slots each having digital information bits and each group is separated in time from the next group by a route switching interval. The arrangement includes means for allocating each of the signal groups to the communication of optical signals to a predetermined destination, and a photonic switch array or configuration controlled during each route switching interval for switching information in each of the allocated signal groups in an optical domain toward the respective predetermined destination.

DETAILED DESCRIPTION

In optical fiber transmission systems, communications from many sources are time multiplexed onto a single optical fiber by sequentially sending samples for each communication, one such sample being sent in each frame of time. Each such time frame or frame then consists of a number of time slots each time slot carrying digital signals such as a sample of digitized voice for a single communication channel. Most modern communication systems use a repetition frequency of 8,000 frames per second for speech (voice) thus making each frame 125 microseconds long.

The number of optical pulses which can be sent over an optical fiber is very large, typically as many as 400,000,000 pulses per second. Typically, eight pulses are required to represent a single voice sample for a single voice channel. While lightwave regenerators that can amplify 400,000,000 optical pulses per second are becoming available, means for injecting the sample representing a single communication onto each frame of an optical transmission system or for removing such a sample are relatively cumbersome. Electrical circuits cannot switch between such high speed signals readily. The present invention is directed toward methods and apparatus for switching optical signals despite these limitations.

Figure 1:
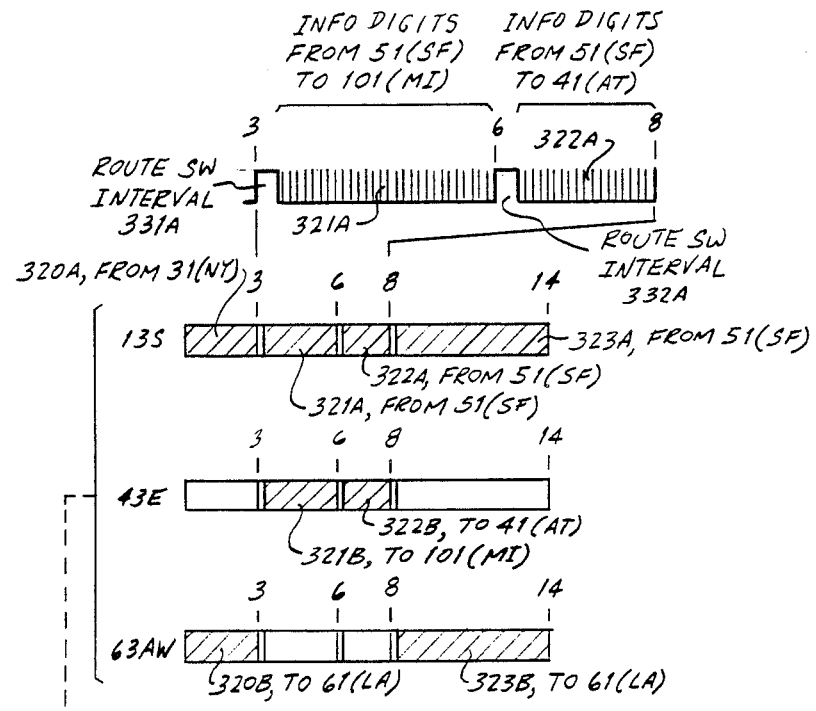
FIGS. 1 and 2 are block diagrams of one node of an optical communication network and of the signals entering and leaving a photonic switch of that node.
Figure 1:
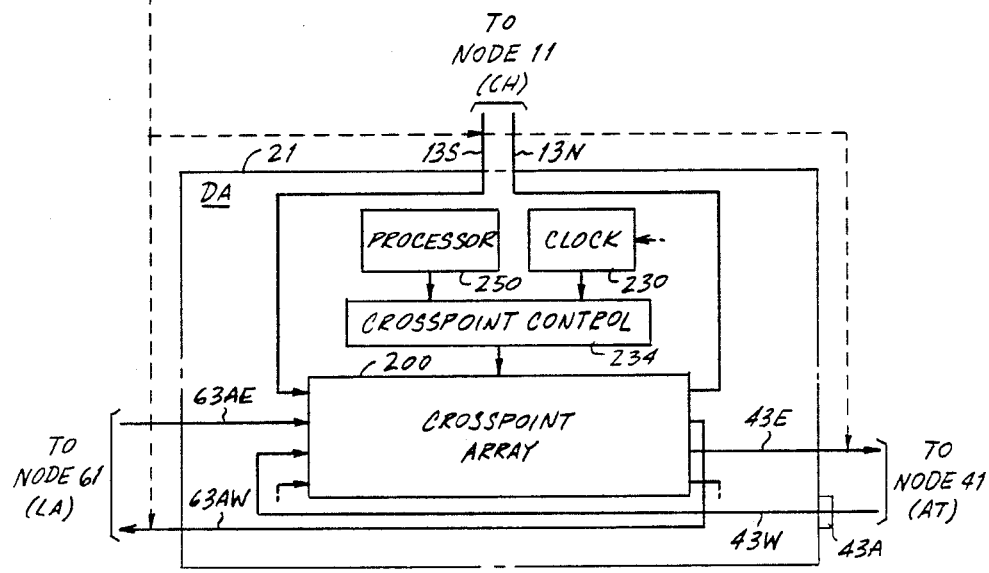
Figure 2:
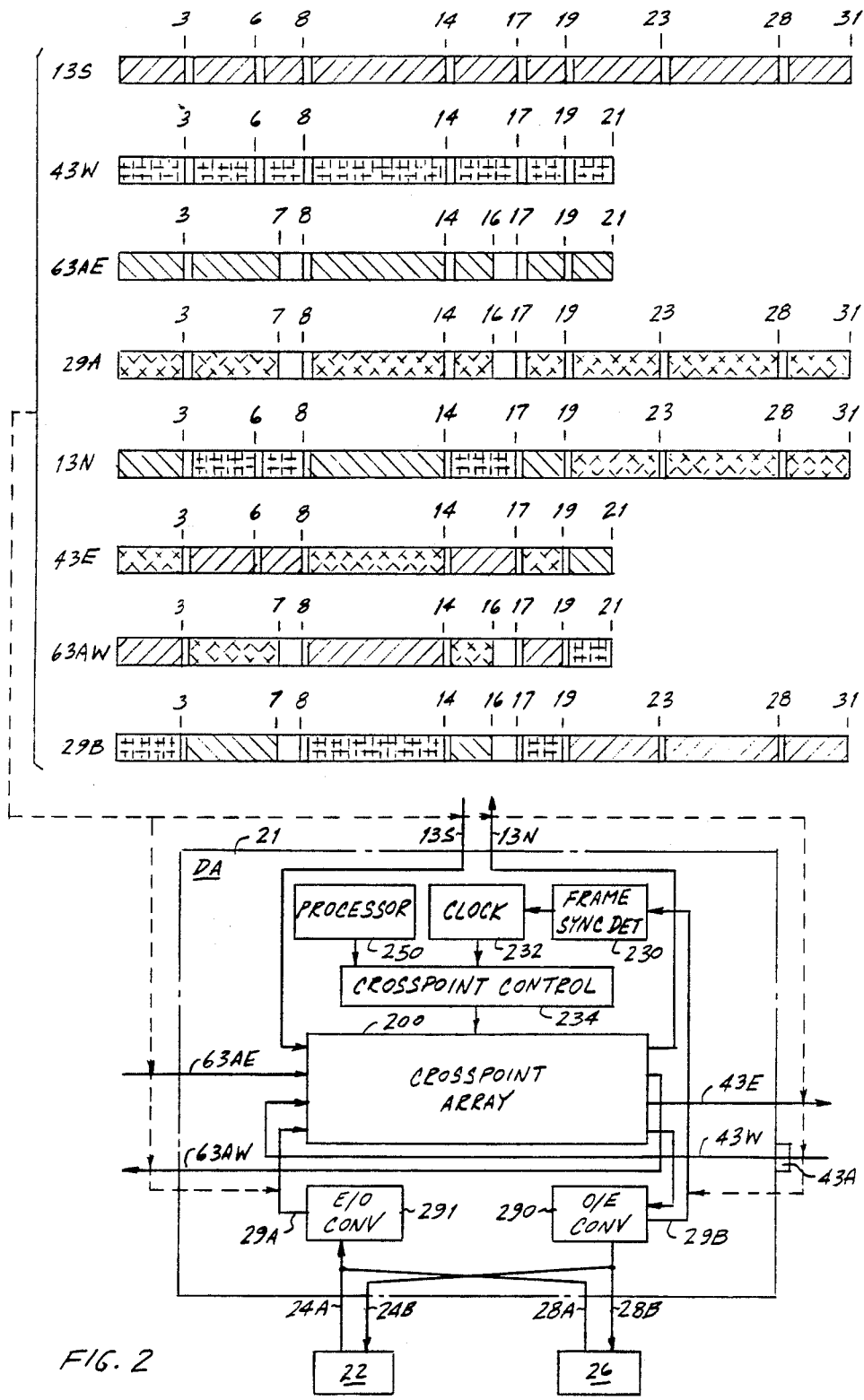
Figure 7:
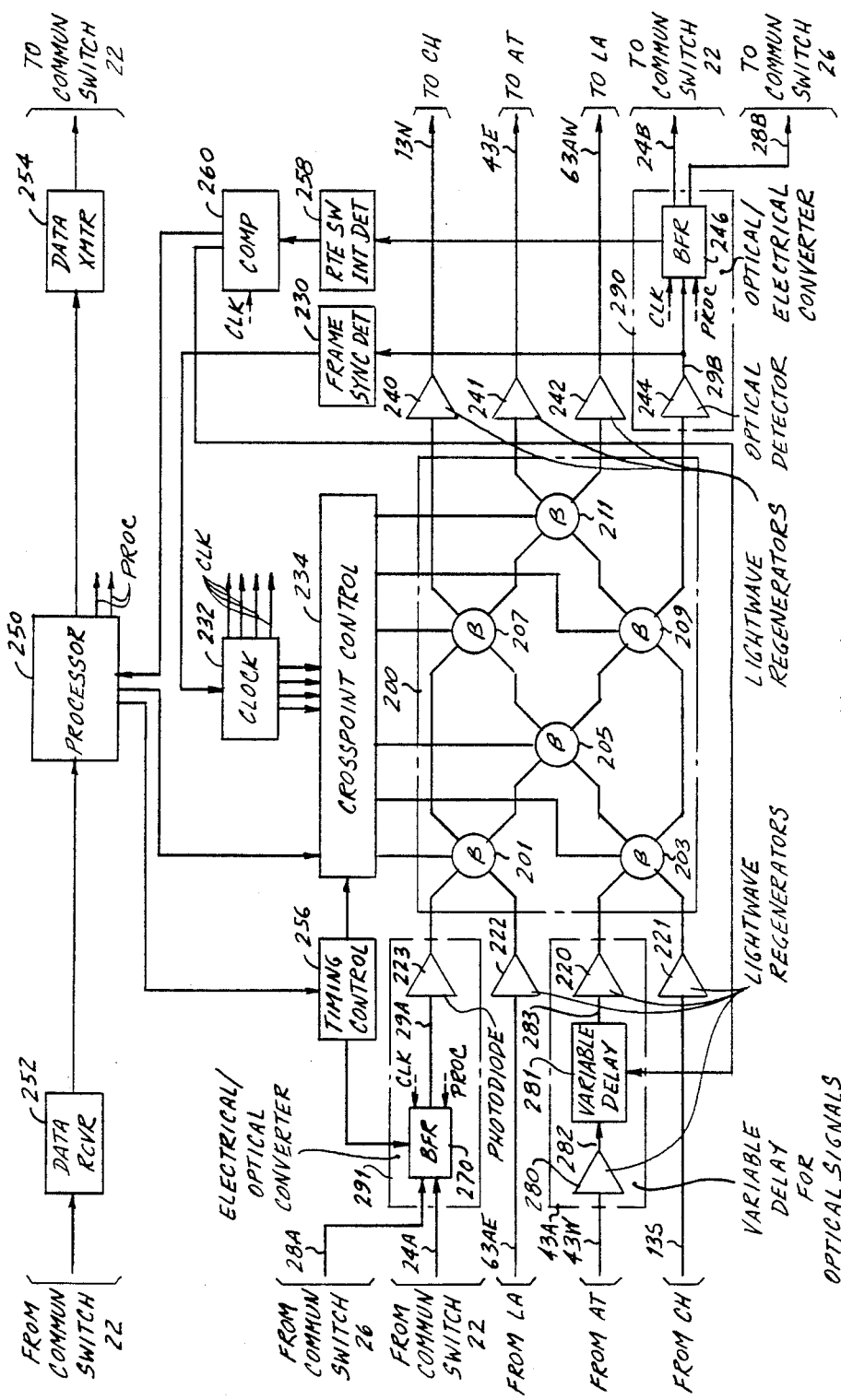
FIG. 7 is a more detailed block diagram of the node of FIG. 2.

FIG. 1 illustrates many aspects of the present invention. Block 21, shown more fully in FIGS. 2 and 7, represents one of 11 nodes of a communication network illustrated in FIG. 3. Node 21 is located in or near the city of Dallas (DA), Texas.

Node 21 comprises a crosspoint array 200 which switches optical signals from one of three input optical streams to one of three output optical streams. The term crosspoint as used herein refers to any switching element, such as a beta element described hereinafter with respect to FIG. 7, that can switch an optical signal from one optical path to another. The three input optical streams are optical signals on optical fibers 13S originating in node 11 located in or near the city of Chicago (CH), Ill.; 63AE originating in node 61 located in or near the city of Los Angeles (LA), California; and 43W originating in node 41 located in or near the city of Atlanta (AT), Ga. The three output optical streams leaving crosspoint array 200 are connected to optical fibers 43E to node 41 (AT); 63AW connected to node 61 (LA); and 13N connected to node 11 (CH). The crosspoint array is controlled by a crosspoint control 234, in turn controlled by a processor 250 and a clock 232.

Optical information signal groups and route switching intervals between such signal groups for input optical stream 13S are further illustrated for the first 14 out of 31 information carrying intervals of a repetitive time frame. The frame is repeated every 125 microseconds so that 8,000 such frames of signals are transmitted over optical fiber 13S each second.

Optic fiber 13S carries signals from node 11, which also contains a photonic switch similar to photonic switch 200 in node 21. In node 11, optic signals from node 31, located in or near New York City (NY), and optic signals from node 51, located in or near San Francisco (SF), Calif. are switched to optic fiber 13S for transmission to node 21. On incoming optic fiber 13S, the first three intervals designated 320A carry information signals originating in node 31 (NY), and destined for node 61 (LA). The signals are switched to outgoing optical path 63AW and are also shown as signals 320B on that path. On incoming optical fiber 13S, the three intervals, 4, 5, and 6, and the two subsequent intervals, 7 and 8, carry information signals 321A and 322A from node 51 (SF). These two signal groups have been expanded to show that each is preceded by a route switching interval 331A and 332A. The signals in group 321A represent information signals destined for node 101 located in or near the city of Miami (MI), Fla., and signals in group 322A represent information signals destined directly for node 41 (AT). Signal groups 321A and 322A are both switched through the crosspoint array 200 to outgoing optic fiber 43E connected to node 41 (AT), where they are shown in signal groups 321B and 322B. Node 41 contains a photonic switch similar to that found in node 21 in which the signals for node 101 (MI) and 41 (AT) are separated from the single bit stream on optic fiber 43E. At node 41, signal group 321B is switched to optic fiber 103E for transmission to node 101 (MI), and signal group 322E is switched to an optical/electrical converter for conversion to electrical signals for transmission to a communication switch 42. The purpose of communication switches is discussed further below with respect to FIG. 2. Signal group 323A occupies intervals 9–14 on incoming optic fiber 13S and represents signals originating at node 51 (SF), destined for node 61 (LA). The signal group 323A is switched to output 63AW of crosspoint array 200 where it is shown as 323B.

Note that a particular stream of optical information signals appears in the same position and time within a frame on each of the optic transmission paths that carry that optical signal. Note also that a route switching interval is inserted before every signal group in order to allow the crosspoint array of a photonic switch to be set up to transmit these signal groups. The crosspoints used in transmitting a signal from an input of crosspoint array 200 to an output of that crosspoint array remain undisturbed during the time that information signals are so transmitted.

Figure 3:
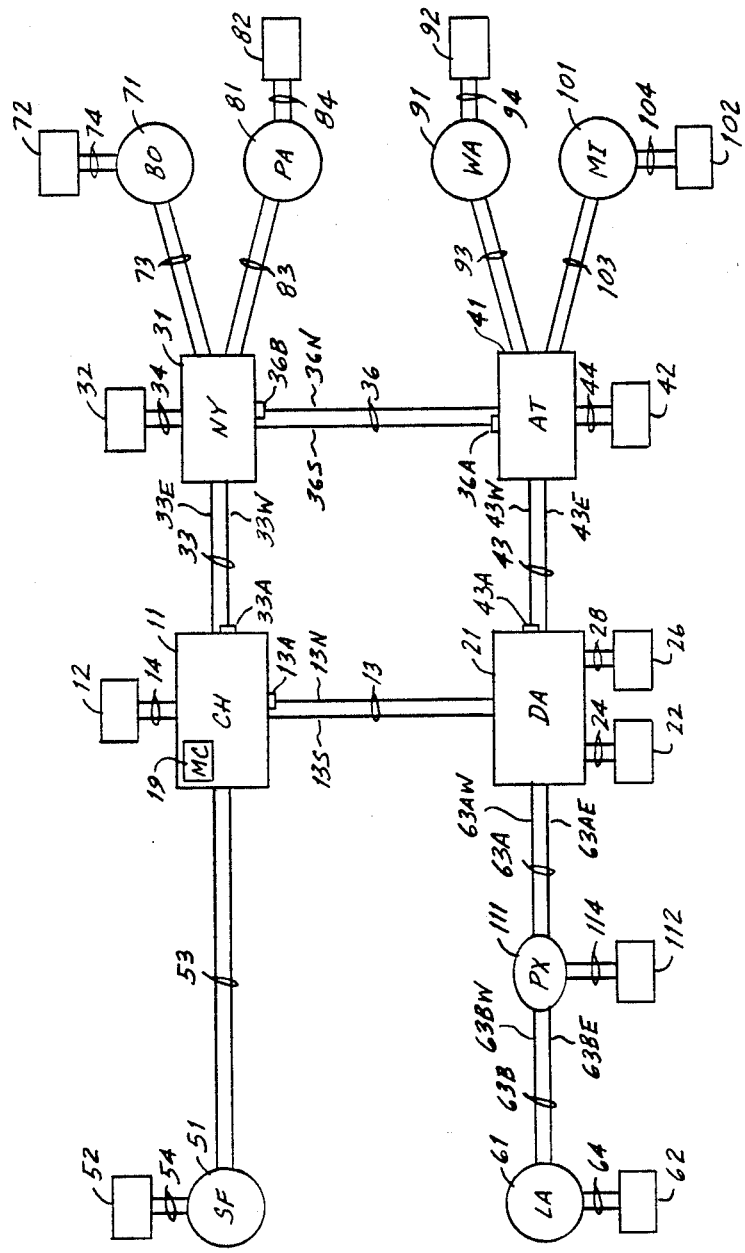
FIG. 3 is a block diagram of a communication network comprising eleven nodes.

FIG. 2 includes a more detailed block diagram of node 21 (DA) of the optical communication network shown in FIG. 3. As previously shown on FIG. 1, inputs to and outputs from node 21 include optic links 13, 43 and 63, each of which comprises two optic fibers transmitting one-way signals into and out of node 21. Optic link 13 comprises optic fibers 13N and 13S from node 11 located in Chicago. The labels N, S, E and W refer to the direction, north, south, east and west, respectively, of signals carried by optic fibers. Optic fiber 13N carries signals north from node 21 (DA) to node 11 (CH), while optic fiber 13S carries signals south from node 11 to node 21. Similarly, an optic link 43 connected to node 41 (AT), comprises two optic fibers 43E carrying signals east from node 21 to node 41, and 43W carrying optic signals west from node 41 to node 21. Optic fiber 43W is connected to node 21 through adjustable delay 43A whose purpose is described below with respect to FIG. 3. Optic link segment 63A, part of optic link 63 connecting nodes 21 and 61 (LA), carries signals between node 21 and node 111 in Phoenix, Ariz.; optic link segment 63A comprises optic fiber 63AE for carrying signals east from node 111 to node 21 and optic fiber 63AW for carrying signals west from node 21 to node 111. The distinction between optic links and optic link segments is discussed below with respect to FIG. 3.

In addition, and not previously shown on FIG. 1, node 21 receives input signals from and transmits output signals to two communication switches 22 and 26. These communication switches may be digital switches such as the 4ESS ™ switches of the type manufactured by AT&T Technologies, Incorporated. For signaling and interswitch data communication, these communication switches are interconnected over a common channel signaling system (not shown). Communication switches 22 and 26 are connected to node 21 by communication links 24 and 28, respectively. Each of the communication links comprises two one-way links, 24A and 24B for link 24, and 28A and 28B for link 28, for carrying signals between the communication switches and node 21 in the two directions. Signals carried over communication links 24 and 28 are carried in the electric domain. Communication paths 24A and 28A are connected to the input of electrical/optical converter 291; similarly, communication paths 24B and 28B are connected to the output of optical/electrical converter 290. Converters 290 and 291 are connected by paths 29B and 29A, respectively, to the photonic crosspoint array 200 described below. The information signal groups on each input, 13S, 43W, 63AE, and 29A, to node 21 are illustrated with a different crosshatching. The corresponding information signal groups on each output 13N, 43E, 63AW, and 29B, are illustrated using the same crosshatching, so that each input signal group can be traced to one of the four output paths.

Photonic crosspoint array 200 of FIG. 2 is a photonic crosspoint array for switching optical signals in the optical domain. Switching in the optical domain is the controlling of switching and communication of optical signals from a source to a destination and does not exclude that translation of optical signals to electrical signals which occurs for optical signal regeneration, nor does it exclude the use of electrical circuits for introducing optical delay. The four inputs to crosspoint array 200 are the signals from optic fibers 13S, 63AE, 43W and the output 29A of electrical/optical converter 291. The four outputs of crosspoint array 200 are signals connected to optic fibers 13N, 63AW, 43E and the output 29B to the optical/electrical converter 290. In crosspoint array 200, connections are established to switch optic signal groups from each of the inputs to each of the outputs. In this exemplary embodiment, all communications are assumed to be duplex so that a connection for sending signals from input A to output B is always accompanied by a connection for sending signals from corresponding input B to corresponding output A. This type of connection is most commonly used in telephone systems. Consequently, when a connection is set up in crosspoint array 200, for example, between optic link 13 and optic link 43, a connection is simultaneously set up between optic fibers 13S and 43E and between optic fibers 43W and 13N.

Crosspoint array 200 is controlled by crosspoint control 234 which applies electrical control signals to the individual elements of crosspoint array 200 in order to set up appropriate paths across crosspoint array 200. Crosspoint control 234 receives instructions from processor 250 concerning which crosspoints to operate and receives timing signals from clock 232 to define the periods when appropriate sets of crosspoints are to be operated.

Processor 250 of node 21 allocates time intervals within a frame for signal groups from all nodes of the network of FIG. 3. These time intervals are allocated according to communications traffic (traffic) needs between each pair of nodes generating communications served by the network. Table I below presents one example of traffic served by this network and Table II below presents corresponding assignments of time intervals for each route. The time intervals allocated within a frame for communications over a given route remain the same over all optical links and photonic switches interconnecting the node at the optical source with the node at the optical destination of the communication.

Each input and output optical bit stream comprises repetitive frames, one of which is illustrated in FIG. 2. The basis for allocating routes to time intervals on each optical bit stream will be discussed further below with respect to FIG. 3. Each repetitive frame of an optical bit stream comprises groups of digital information bits (signal groups) interspersed between route switching intervals. Each signal group is switched together from one input of crosspoint array 200 to one output and the connection between the input and output is maintained for the duration of that group of digital information bits. At the time of a route switching interval, a new connection may be set up in crosspoint array 200. This new connection must be set up by the time that the next group of digital information bits appears in the input optical bit stream.

In order to allow time multiplexed communication signals to be switched between optical links without requiring the electrical signals corresponding to the optical signals to be generated, demultiplexed, and switched, it is necessary that the optical signals either be directly switchable from one optical fiber pair to another, or be converted to electrical form and switched in the electrical domain; the latter is difficult and expensive because of the very high bit rate of optical signals. In order to implement a photonic switch, i.e., a switch operating in the optical domain, most economically, i.e., without requiring additional buffering, it is desirable that information signals appear on the incoming optical fiber of an optical link at the same time that the outgoing optical fiber of another link is available for receiving these information signals. In order to accomplish this goal it is necessary that incoming signals on different optical fibers arrive at a photonic switch in frame synchronism. In some cases, as discussed further below, in order to achieve frame synchronism, variable delay must be introduced in series with an optical fiber. From one incoming frame synchronizing signal, a single clock is derived. The photonic switch uses the clock to indicate the time corresponding to the interval within a frame when signals are to be switched between two optical fibers, or to be switched between an optical fiber and an optical/electrical converter for transmission over an electrical communication link, or to be transmitted to an optical fiber from an electrical/optical converter connected to an electrical communication link.

In this example, a time frame is divided into 32 equal parts or intervals, one interval being used for the frame synchronization signal, the other 31 intervals being used for the transmission of digital information bits. The frame itself, as discussed above, is 125 microseconds long and each of the 31 intervals is sufficiently long to contain digital information bits for 24 voice samples, corresponding to a voice sample from each of the 24 channels of a carrier group. As discussed further below, groups of intervals may carry more digital information per interval since only one route switching interval is required per signal group.

FIG. 2 shows which input bit streams are connected to which output bit streams for each interval through the use of a common crosshatching appearing at an input and output. For example, output 13N receives signals from input 63AW for the time intervals 1-3. A route switching interval separates information signals in the third from those in the fourth time interval. Output 13N receives signals from input 43W for time intervals 4-6 and 7-8, with a route switching interval between intervals 6 and 7; this intermediate route switching interval is inserted in the optical bit stream so that a switch may take place between these two groups of time intervals in a subsequent photonic switch without losing any information bits. Output 13N further receives signals from input 63AE during intervals 9-14, from input 43W during intervals 15-17, and from input 63AE during intervals 18-19. Finally, output 13N receives signals from input 29A connected to converter 291, corresponding to signals from communication switches 22 and 26, during the intervals 20-31, with route switching intervals inserted between intervals 23 and 24 and between intervals 28 and 29. Route switching intervals also occur on output 13N between information signals in groups 8 and 9, 14 and 15, 17 and 18, and 19 and 20. Route switching intervals are inserted between two adjacent signal groups whenever these adjacent signal groups must be switched to different optical paths in some photonic switch, i.e., whenever the signal groups come from different source nodes or are destined for different destination nodes.

Figure 6:
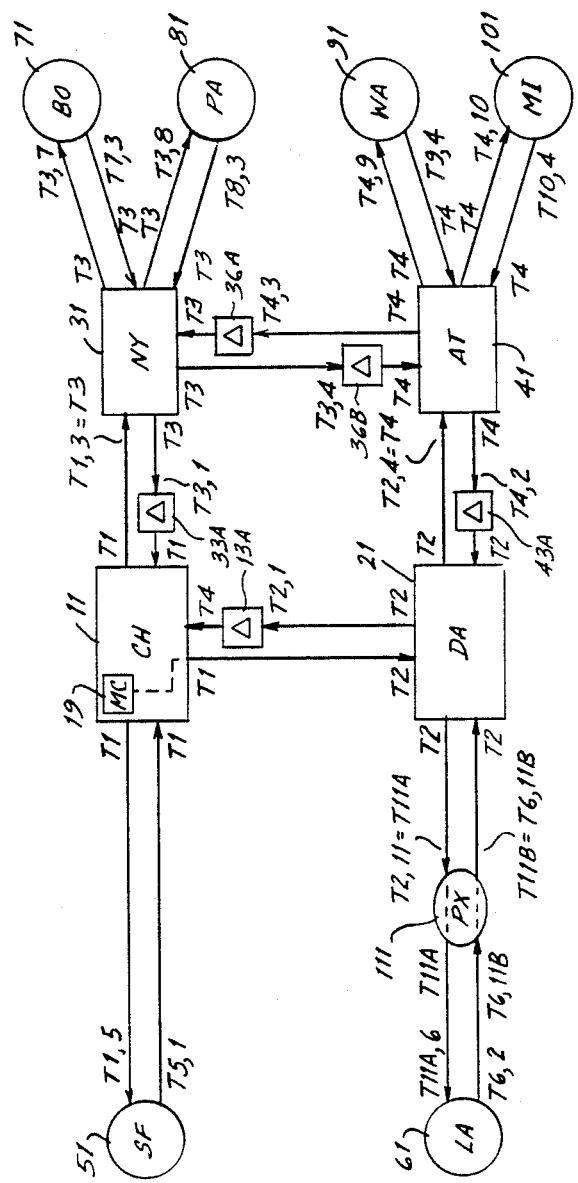
FIG. 6 illustrates timing relationships among the nodes of the network of FIG. 3.

Arrangements for synchronizing inputs to photonic switches throughout the network are discussed in greater detail with respect to FIG. 6. Briefly, synchronization for node 21 is achieved by first deriving a synchronizing signal from one input, in this case, input 13S from node 11, which is switched through crosspoint array 200 to output 29B. Frame synchronizing detector 230, operating in the electrical domain, is used to detect this switched frame synchronizing signal received at node 21 from input 13S. This input is from node 11, which in this exemplary embodiment contains a master clock (box 19, FIG. 3) for the network. The frame synchronizing detector 230 is driven by optical/electrical converter 290 so that this detection process can take place in the electrical domain. Frame synchronizing detector 230 is used to drive clock 232 of node 21. Deviations from synchronism of other inputs to crosspoint array 200 are detected in this embodiment by comparing the time of occurrence of route switching intervals from these other input optical bit streams with the time corresponding to route switching intervals as indicated by clock 232; if all input bit streams were in perfect synchronism, no such deviations would be detected. This process is described in further detail with respect to FIG. 7.

FIG. 3 illustrates the network of interconnected communication nodes discussed herein. Nodes containing a photonic switch are represented by large rectangles 11, 21, 31, and 41. Nodes for terminating optical communication links are represented by circles 51, 61, 71, 81, 91, and 101. Branch node 111 for removing and inserting optical signals into an optic communication link without terminating the link is represented by an oval. In addition, the network of FIG. 3 shows communication switches 12, 22, 26, 32, 42, 52, 62, 72, 82, 92, 102, 112, each connected to one of the 11 nodes by electrical communication links 14, 24, 28, 34, 44, 54, 64, 74, 84, 94, 104, and 114, respectively. Each of these electrical communication links comprises a group of electrical communication links, and each electrical communication link within a group comprises two one-way links. The nodes are interconnected by optic links 13 between nodes 11 and 21, 33 between nodes 11 and 31, 36 between nodes 31 and 41, 43 between nodes 31 and 21, 53 between nodes 51 and 11, 63 comprising optic link segments 63A between nodes 21 and 111 and 63B between nodes 111 and 61, 73 between nodes 71 and 31, 83 between nodes 81 and 31, 93 between nodes 91 and 41, and 103 between nodes 101 and 41. Nodes 11, 21, 31, 41, 51, 61, 71, 81, 91, 101, and 111 are located in or near the cities of Chicago (CH), Dallas (DA), New York (NY), Atlanta (AT), San Francisco (SF), Los Angeles (LA), Boston (BO), Philadelphia (PA), Washington (WA), Miami (MI), and Phoenix (PX), respectively.

In a practical network, each node is likely to be connected to a plurality of communication switches. This type of arrangement is shown in FIG. 3 only for the Dallas node 21; two switches, 22 and 26, are connected to node 21 by communication links 24 and 28. It is understood that the other nodes of this example are likely to have additional connected switches which are not shown in the diagram.

For many of the communication routes between communications switches, only a single optical link is required. For example, communication signals for the communication route between communication switches 52 in San Francisco and 12 in Chicago are transmitted by optical link 53. For some communication routes, two optical links are required and a switch at one of the nodes 11, 21, 31, or 41 is required to transfer signals from one optical link to another. For example, communication signals between communication switches 52 in San Francisco and 32 in New York are transmitted over optical links 53 and 33. These communication signals are switched between optical link 53 and optical link 33 by the photonic switch at node 11. Some of the communication signals must be switched twice. For example, communication signals between communication switches 32 in New York and 62 in Los Angeles are transmitted over optical links 33, 13, and 63. These communication signals are switched between optical links 33 and 13 by the photonic switch at node 11 and between optical links 13 and 63 by the photonic switch at node 21.

For the purposes of this description, an optical link interconnects two nodes, at least one of which contains a photonic switch; the frame synchronizing signals for an optical link are generated at the two ends of that link. An optical link, such as link 63 which comprises segments 63A and 63B, may pass through intermediate nodes, called branch nodes, such as the Phoenix node 111 discussed below with respect to FIG. 10, where signals can only be transmitted and received with timing consistent with the frame synchronizing signal of incoming optical signals, and where no new frame synchronizing signal is generated for any transmitted signals. Segment 63A connects nodes 21 and 111, and segment 63B connects nodes 111 and 61.

Each node must have an accurate clock. The direct or indirect source of all node clocks is a master clock 19, located in this case at the Chicago node 11. The timing of the frame synchronizing signal for outgoing optical signals from nodes such as nodes 51, 61, 71, 81, 91, and 101, which do not contain a photonic switch but which are at one end of an optical link, is determined by the requirement that the output of each such node must arrive in frame synchronism with the outputs of other nodes connected to a common photonic switch. Once frame synchronization is achieved, the clock of each node containing a photonic switch is used to identify route switching interval times, when new paths may be set up in a photonic switch. As discussed hereinafter, it may also be necessary to introduce an adjustable delay in one or both fibers of an optical link between two photonic switches, such as delay 43A of FIG. 2 in series with optical fiber 43W of optical link 43, in order to achieve and maintain frame synchronism among all input signals to a photonic switch.

The allocation of information signal groups to different routes is controlled by a centralized processor, in this embodiment, processor 250 in the Dallas node. The processor communicates with other processors in the communication network by data messages which are used by the receiving processors in other nodes to cause the digital information bits of a signal group, generated by one or more communication switches connected to the node, to be taken off and inserted at the appropriate intervals of a frame, and which are used by the receiving processors at nodes comprising a photonic switch to control the array of crosspoints, such as array 200 of node 21, of that photonic switch. Messages to the processors at each network node that generates an optical signal are also used to make adjustments in the frame time of optical signals generated at a given node so that such signals arrive in frame synchronism with other incoming signals and the clock at the connected photonic switch. On the basis of traffic data received by processor 250, that processor can also arrange to allocate extra channel groups for high traffic on some of the routes.

The allocating process must ensure that a given time interval in a frame is available in all the optical links joining a source and destination. Traffic from the communication switches associated with one node, such as the two communication switches 22 and 26, and destined for the communication switches associated with another node, can be gathered into a single signal group in the source node since such signals can be switched together in all the photonic switches of a network. The optical links between photonic switches, such as links 13, 33, 36, and 43 carry traffic from a plurality of sources to a plurality of destinations and therefore particular care must be given to assignment of information signal groups to particular intervals to ensure that there are no conflicts on these links. Where there is a choice among optical links connecting photonic switches to carry traffic from a given source to a given destination, preference should be given to allocating such traffic to those links which are less heavily loaded. Thereafter, traffic can be allocated to specific time intervals on the allocated optical links, first, by allocating traffic to time intervals on optical links between photonic switches. Within the routes associated with such traffic, traffic should first be allocated to time intervals for those routes involving the largest number of optic links between photonic switches, and within a group, to those optical links that are most heavily used. After all traffic using links between photonic switches has been allocated to specific time intervals, traffic between nodes containing a photonic switch and branch nodes can be allocated to remaining free time intervals followed by the assignment of time intervals for traffic between branch nodes and then between branch nodes and nodes at the end of an optical link. Finally, time intervals for traffic between nodes containing photonic switches and nodes at the end of an optic link can be allocated. By packing traffic through the process of assigning low numbered time intervals first, a reasonable allocation of traffic may be generated. More sophisticated allocation processes may be developed through selective use pairwise interchanges among the allocations and through the use of an algorithm which matches the size of an open group of time intervals to the size required to meet traffic demands.

Table I shows an example of the amount of communication traffic which is to be transmitted between pairs of the nodes 11, 21, 31, 41, 51, 61, 71, 81, 91, 101, and 111. For clarity, in this example traffic is not transmitted between all pairs of nodes of the network. Traffic to or from a node is traffic to or from the communication switches connected to that node. The numbers shown in Table I refer to numbers of groups of 24 two-way communications corresponding to the 24 two-way channels which are conveyed by a single digital T1 carrier group of the type used in the United States. Table I shows, for example, that four groups serve traffic between New York node 31 and San Francisco node 51, eight groups between Dallas node 21 and Atlanta node 41, and two groups between Chicago node 11 and Los Angeles node 61. The groups could also be in multiples of 32 to conform to the standard used in Europe, or could be multiples of either size group. The size of the group to be switched is selected to match the characteristics of the optic fiber and lightwave regenerator system, and the number of channels typically carried on one fiber.

TABLE I

| TO | FROM | | | | | | | | | | |
|----|------|------|------|------|------|------|------|------|------|------|------|
|    | NY | CH | SF | LA | DA | AT | BO | PA | WA | MI | PX |
| NY |    | 10 | 5  | 4  | 4  | 4  | 2  | 2  | 4  | 2  |    |
| CH | 10 |    | 4  | 2  | 7  | 4  | 2  | 2  |    |    |    |
| SF | 5  | 4  |    | 8  | 5  | 2  |    |    |    | 4  |    |
| LA | 4  | 2  | 8  |    | 5  | 2  |    |    |    |    | 4  |
| DA | 4  | 7  | 5  | 5  |    | 8  |    |    | 2  | 4  | 2  |
| AT | 4  | 4  | 2  | 2  | 8  |    | 4  | 2  | 2  | 4  |    |
| BO | 2  | 2  |    |    |    | 4  |    | 5  | 2  | 4  |    |
| PA | 2  | 2  |    |    |    | 2  | 5  |    | 4  | 2  |    |
| WA | 4  |    |    |    | 2  | 2  | 2  | 4  |    | 3  |    |
| MI | 2  |    | 4  |    | 4  | 4  | 4  | 2  | 3  |    |    |
| PX |    |    |    | 4  | 2  |    |    |    |    |    |    |

While the size of the channel group in this exemplary embodiment has been selected as 24, much larger sizes are probably appropriate for optical fibers with very high capacities such as those which can transmit 400,000,000 bits per second or about 6,000 channels. With such a large number of channels, the number of channels in a channel group would more appropriately be 128 or 512 channels. The number of channels in a group is determined by a tradeoff including factors such as the length of time required to switch in a photonic switch, economically achievable variations in frame synchronizing times, the number of nodes in the network, and the requirements to interface with lower speed electrical or optical transmission systems in order to interface with communication switches such as 12, 22, 26, 32, 42, 52, 62, 72, 82, 92, 102, and 112.

Table II illustrates an allocation of traffic to time slot groups, each corresponding in time to one of the 31 intervals, illustrated, for example, in FIG. 2, for each of the 11 optical links or optical link segments of the network and the communication links connecting communication switches and nodes, corresponding to the traffic numbers of Table I. The allocation of time slot groups for each route meets the criterion that a particular time slot group on a particular link is used on no more than one route. For example, Table II shows that New York - Los Angeles traffic has been allocated the first three time slot groups of the New York communication link 34, New York - Chicago optical link 33, Chicago - Dallas optical link 13, Dallas - Los Angeles optical link 63, and Los Angeles communication link 64. Table II further indicates, for example, that in the Chicago - Dallas optical link 13, time slot groups 1-3 are allocated to carry traffic between New York and Los Angeles, time slot groups 4-6 between San Francisco and Miami, time slot groups 7 and 8 between San Francisco and Atlanta, time slot groups 9-14 between San Francisco and Los Angeles, time slot groups 15-17 between Chicago and Atlanta, time slot groups 18 and 19 between Chicago and Los Angeles, time slot groups 20-23 between Dallas and San Francisco, time slot groups 24-28 between Dallas and Chicago, and time slot groups 29-31 between Dallas and New York. The signals to and from communication switches 22 and 26 connected to the Dallas node 21 are received or transmitted as one larger group and separated or combined in electrical domain buffer blocks 270 and 246 (FIG. 7) within the converters 290 and 291, respectively. The gap corresponding to time slot group 32, equivalent to time slot group 0 of the next frame, has been set aside to provide an easily and rapidly recognizable frame synchronizing signal. Only one allocation need be shown for each route since the same allocation is used for the two directions of transmission of the two optical fibers in an optical link, and for the two directions of transmission over communication links between digital switches and nodes of the network.

TABLE II

| Route | Time Slot Groups | Optical and Communication Links |
|---|---|---|
| NY-LA | 1-3 | 34,33,13,63A,63B,64 |
| MI-DA | 1-3 | 104,103,43,(24,28) |
| BO-AT | 1-3 | 74,73,36,44 |
| SF-CH | 1-3 | 54,53,14 |
| BO-CH | 4-5 | 74,73,33,14 |
| NY-AT | 4-6 | 34,36,44 |
| SF-MI | 4-6 | 54,53,13,43,103,104 |
| LA-DA | 4-7 | 64,63B,63A,(24,28) |
| PA-CH | 6-7 | 84,83,33,14 |
| SF-AT | 7-8 | 54,53,13,43,44 |
| MI-PA | 8-9 | 104,103,36,83,84 |

TABLE II-continued

| Route | Time Slot Groups | Optical and Communication Links |
|---|---|---|
| NY-CH | 8-14 | 34,33,14 |
| SF-LA | 9-14 | 54,53,13,63A,63B,64 |
| AT-DA | 9-14 | 44,43,(24,28) |
| MI-BO | 10-12 | 104,103,36,73,74 |
| WA-PA | 13-15 | 94,93,36,83,84 |
| PX-DA | 15-16 | 114,63A,(24,28) |
| CH-AT | 15-17 | 14,13,43,44 |
| SF-NY | 15-18 | 54,53,33,34 |
| WA-BO | 16-17 | 94,93,36,73,74 |
| CH-LA | 18-19 | 14,13,63A,63B,64 |
| PA-AT | 18-19 | 84,83,36,44 |
| WA-DA | 18-19 | 94,93,43,(24,28) |
| MI-WA | 20-21 | 104,103,93,94 |
| LA-AT | 20-21 | 64,63B,63A,43,44 |
| PA-NY | 20-21 | 84,83,34 |
| DA-SF | 20-23 | (24,28),13,53,54 |
| BO-NY | 22-23 | 74,73,34 |
| WA-AT | 22-23 | 94,93,44 |
| PX-LA | 22-24 | 114,63B,64 |
| WA-NY | 24-26 | 94,93,36,34 |
| PA-BO | 24-27 | 84,83,73,74 |
| DA-CH | 24-28 | (24,28),13,14 |
| MI-NY | 27-28 | 104,103,36,34 |
| DA-NY | 29-31 | (24,28),13,33,34 |
| MI-AT | 29-31 | 104,103,44 |

Figure 4:
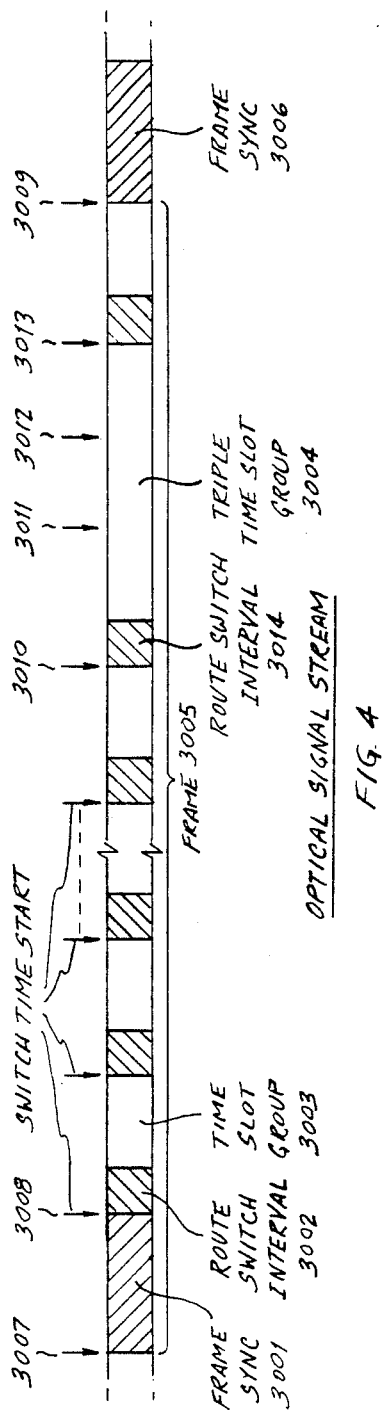
FIG. 4 is a time diagram of an optical bit stream including parts of two time frames.

FIG. 4 is a timing diagram of a typical bit stream on an optical link. Every frame, such as 3005, has a characteristic frame synchronization signal 3001,3006, indicated by time arrows 3007 and 3009, and every signal group, such as single time slot group 3003 which carries a single 24-channel group, and triple time slot group 3004 which, as explained below, carries four 24-channel groups, has a separate associated route switching interval signal, 3002 and 3014, respectively. Switching may not begin before the time indicated by one of the arrows such as 3007, 3008, 3009, 3010, 3013 and must be completed before a frame synchronizing interval or route switch interval is completed. The frame synchronizing signal should be readily recognizable with a readily recognizable end; it may consist, for example, of a series of 1's, terminated by two 0's and two 1's to indicate the end. The route switching interval signal is designed so that a switch may be made in the middle of that signal and there will still be a characteristic signal available for indicating the end of the interval and the start of the signal group. For example, the route switching interval signal might consist of alternate 1's and 0's, ending with two 1's followed by two 0's.

It is necessary to be able to locate the beginning of a signal group in order to control a photonic switch. It is possible to have a set of time slot groups representing one larger signal group such as triple time slot group 3004 which starts after route switching interval 3014 and lasts until arrow 3013, with no intermediate route switching interval between adjacent subgroups of the longer signal group, since it is not necessary to switch signals except at the boundaries of a signal group being transmitted to a common destination. However, the start of signal groups in different optic fibers must be synchronized in time so that the photonic switch can switch the information signals within each signal group between these fibers. Thus, even if a transmission of information signals of a longer signal group were to be completed before the beginning of the next route switching interval, no new signal group could start before that time. In FIG. 4, arrows 3008, 3010, 3011, 3012, and 3013 indicate the start of times when the connection in a photonic switch could be changed; however, since no switch is made at the time indicated by arrows 3011 and 3012, no route switching interval signal need be inserted at that time, so that added communication signals may be transmitted instead.

A single time slot group for carrying 24 voice channels comprises 193 pulses. Each frame is 125 microseconds long; this corresponds to an 8 kiloHertz speech sampling rate as used in most present-day pulse code modulation (PCM) speech carrier systems. The 125 microsecond interval is broken down into 32 intervals, each 3.90625 microseconds long. The first interval is reserved for a frame synchronizing signal. Each subsequent interval of 3.90625 microseconds comprises either about 1.3 microseconds for a route switching interval signal of 97 pulses and about 2.6 microseconds for the 193 pulses of one frame of a 24-channel time slot group signal or, if the interval carries information signals for a signal group started in a previous interval, 3.90625 microseconds for 290 information pulses, enough for 1.5 24-channel time slot group signals. For example, in the interval of the triple time slot group indicated between arrows 3010 and 3013, a total time of approximately 11.72 microseconds or 870 pulse times, the single route switching interval signal occupies 1.3 microseconds or 97 pulse times, leaving 10.42 microseconds, or 773 pulse times, enough time to transmit four groups of 193 pulse (772 pulse times). Thus, a triple time slot group interval can be used to transmit information signals for four channel groups of 24 channels each. Therefore, any of the entries in Table II which show an allocation of time intervals for three or four time slot groups can carry four or five channel groups, respectively, five or six time slot groups can carry seven or eight channel groups, respectively, and seven time slot groups can carry ten channel groups. This explains the difference between the number of required channel groups of Table I and the number of time slot groups of Table II for each route.

The overall pulse rate of this fiber optic system is 8000 frames/second × 32 time slot group intervals/frame × (193 + 97) pulses/time slot group intervals = 74,240,000 pulses per second, well within the limits of modern fiber optic technology.

Figure 5:
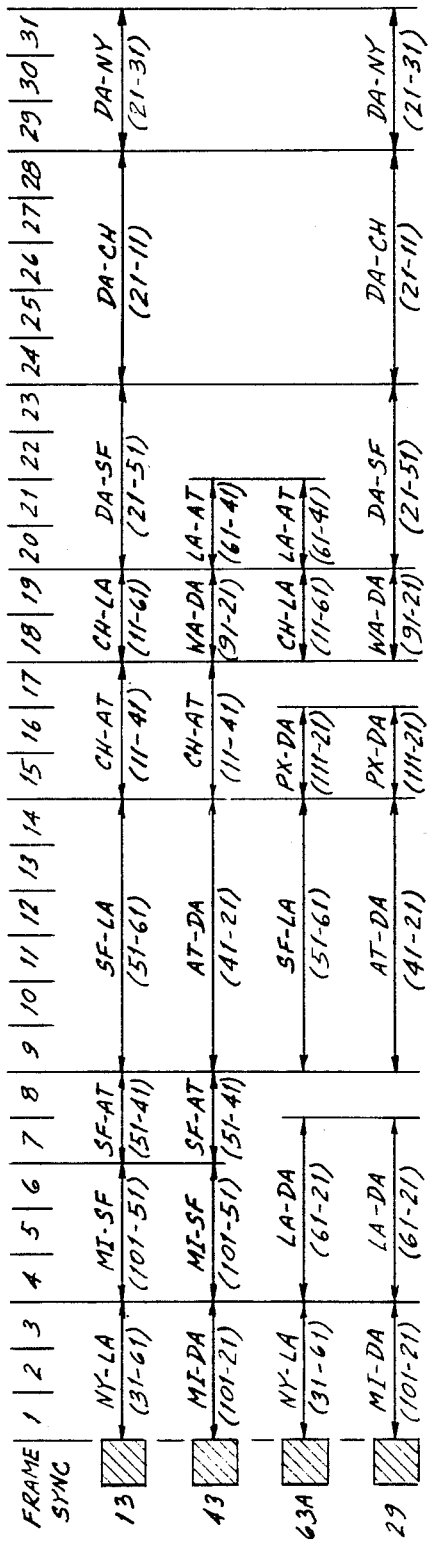
FIG. 5 is a time diagram of the signals of the communication network being switched in one time frame at the photonic switch.

FIG. 5 is a diagram of the signals appearing in one frame on each of the four inputs and outputs of photonic crosspoint array 200 in node 21 during the 31 information transmission intervals, corresponding to time slot group intervals, that are included in each frame. The four inputs to that node include three inputs from optical links or link segments 13 (from Chicago), 43 (from Atlanta), and 63A (from Los Angeles and Phoenix), and one input from communication links 24,28 from the Dallas communication switches 22,26, which appears as a signal on input 29A. During time slot group intervals 1–3, incoming signals from Miami node 101 and the Dallas digital switches 22,26 appear on the optical link 43 and input 29A. These are switched at the Dallas node 21 to outgoing signals to output 29B and to optical link 43 for communication to one of the Dallas digital switches 22 and 26 and to the Miami node 101, respectively. Similarly, incoming signals from the New York node 31 and the Los Angeles node 61 appear on optical link and link segment 13 and 63A for communication to the Los Angeles node 61 and the New York node 31, respectively. The other entries of FIG. 5 show all the other signals that are switched at the Dallas node 21, and the time slot groups for which each switch is made.

Each of the entries in FIG. 5 correspond to some entry on Table II. For example, the New York - Los Angeles entries for time slot groups 1–3 correspond to the New York - Los Angeles entry on Table II. FIG. 5 has an entry for every route of Table II which goes through the Dallas node 21.

Processor 250 receives traffic allocation requests via data receiver 252 from communication switch 22 which is connected through a common channel signaling system network with other communication switches of the network shown in FIG. 3. Processor 250 acts as an allocating processor to allocate traffic to individual time slot groups of the optical links of the network as described above. Processor 250 transmits data messages to other nodes via data transmitter 254 whose output is transmitted to communication switch 22 for transmission over the common channel signaling system to other communication switches, thence to nodes.

The optical signals of the network of FIG. 3 are synchronized using the arrangement illustrated in FIG. 6. FIG. 6 uses the convention that $T_i$ is the timing signal for an output of node il and that $T_{i,j}$ is the timing signal for an output of node il arriving at node jl, i and j being integers that range from 1 to 11.

Chicago node 11 containing master clock 19 is the master source of frame timing signal $T_1$. Dallas node 21 receives a signal generated at Chicago node 11 at $T_1$ and received at $T_{1,2}$, defined to be the frame synchronizing signal $T_2$ for the photonic switch of Dallas node 21. Node 21, receives input signals from Los Angeles node 61 generated at time $T_{6,2}$. These signals are generated so that they arrive at the Dallas node 21 in frame synchronism with $T_2$. The route switching interval signals of incoming signals from Los Angeles are compared with the clock signal corresponding to that route switching interval, in order to detect any change; when a change is detected, a data message is sent from processor 250 to a processor (not shown) in Los Angeles node 61 to bring the signals transmitted from node 61 back into frame synchronism with the Dallas clock $T_2$. Traffic originated in one of the Dallas digital switches 22 and 26 is synchronized with the Dallas clock $T_2$ before entering photonic crosspoint array 200 at input 29A. Thus, all communication signals arriving in the photonic switch of Dallas node 21 from Los Angeles node 61 and from the communication switches 22 and 26 in Dallas are kept in frame synchronism with signals from the Dallas node, in turn synchronized to the Chicago node 11, the source of the frame synchronism signals for the network.

More generally, in the case of a node such as the Los Angeles node 61 or San Francisco node 51 which generates an outgoing timing signal to an optical fiber but does not switch any signals between optical fibers, the outgoing timing signal from that node can be arranged to arrive in synchronism with the frame synchronism of the destination node, such as Dallas in the case of the Los Angeles node, through the use of appropriate adjustable electrical buffering prior to generating an optical bit stream. This synchronism is achieved through the process of sending messages to the Los Angeles node 61 or San Francisco node 51 in order to request an appropriate delay of the signals generated at that node. For signals originating in the communication switches connected to a node, such as switches 22 and 26 connected to Dallas node 21, the delay is inserted through the use of a buffer such as buffer 270, FIG. 7. In this example, buffer 270 comprises registers, connected to incoming signals from links 24A and 28A, having a capacity for signals originating from the connecting digital switch or switches for two time frames; then one register, comprising a two port memory to allow concurrent loading and unloading, is used to deliver signals to photodiode 223 (FIG. 7) while the other register is being loaded; the time delay before each buffer register starts to be unloaded so that its output signals are delivered to the photonic switch can be controlled by the timing control 256.

Referring to FIG. 6, a problem arises in trying to synchronize traffic from the Dallas node 21 to the Chicago node 11, or from New York node 31 to Chicago node 11, or between Atlanta node 41 and New York node 31, or from Atlanta node 41 to Dallas node 21. The traffic from Atlanta node 41 to Dallas node 21 is used as an example. The clock for the Atlanta node 41 is derived from incoming signals from the Dallas node 21 arriving over optical fiber 43E and all traffic at the Atlanta node 41 is synchronized with this derived clock in order to allow switching to take place in the photonic switch at the Atlanta node. However, since we cannot guarantee that the delay in the Atlanta to Dallas optic fiber 43W within optic link 43 is within a small fraction of one route switching interval of the delay in the Dallas to Atlanta optic fiber 43E within the same optic link 43, it is necessary to introduce some form of buffering to allow the signals on optic fiber 43W from Atlanta node 31 to arrive in the Dallas node 21 photonic switch in frame synchronism with the clock of Dallas node 21. The additional buffering is indicated symbolically in FIGS. 3, 6, and 7 by the box 43A. Similar delays 13A in series with optic fiber 13N, 33A in series with optic fiber 33W, 36A in series with optic fiber 36N, and 36B in series with optic fiber 36S are also required to achieve frame synchronism within each of the four nodes 11, 21, 31, and 41 that contain a photonic switch.

From this discussion, it can be observed that an adjustable delay is required in series with any optical fiber interconnecting two nodes comprising photonic switches, except those optical fibers that transmit a clock signal for the receiving node. For the Dallas to Chicago optic link, since one of the optic fibers, 13S, transmits a clock, an adjustable delay is only required for the 13N optic fiber. In the case of the Atlanta to New York optic link 36, since the clock for neither the Atlanta node 41 nor the New York node 31 is carried by optical link 36, it is necessary that optical link 36 include a delay in series with each of the pair of optical fibers, 36N and 36S. A convenient place to locate such an adjustable delay is at the receiving end of the optical fiber, for example, in box 43A (FIGS. 3, 6, and 7). At that point, the frame synchronizing signal of the incoming optical signal can be detected; then, the difference between the time of that frame signal and the time of the master frame signal for the photonic switch at that node can be used to determine how much delay should be inserted.

If there are technological advances which make it possible to limit variations in the delay between two fibers of a an optic link, then it may not be necessary to provide this additional buffering, or it may be possible to reduce the maximum variable delay required. Such technological advances could be achieved through means such as adjusting the length of one fiber with respect to the other and through the design of cables having the property that changes in temperature will not substantially affect the differential delay between the two fibers in the cable. Also, optical delay lines might be used to compensate for constant differential delay. The required accuracy of frame synchronization is determined by the length of the route switching intervals. The route switching interval must be long enough to compensate for differences in frame synchronism between signals on different inputs to a photonic switch and to allow for time to set up a new photonic switch connection.

Timing for other nodes will now be discussed. Nodes 31 and 41 derive their clocks T3 and T4 from the frame synchronizing signal of incoming optical signals from nodes 11 and 21, respectively, and all traffic to these nodes must be frame synchronized to these derived clocks. Traffic from Boston node 71 and Philadelphia node 81, generated at times T7,3 and T8,3, respectively, is timed to arrive at New York node 31 in frame synchronism with T3, using the same techniques previously discussed for synchronizing the output of San Francisco node 51 and Los Angeles node 61 with the input to Chicago node 11 and Dallas node 21, respectively. Similarly, traffic from Washington node 91 and Miami node 101, generated at time T9,4 and T10,4, respectively, is timed to arrive at Atlanta node 41 in frame synchronism with T4. Nodes 71, 81, 91, and 101 derive their clocks from incoming clocks T3,7; T3,8; T4,9; and T4,10 and adjust their outgoing frame synchronizing signal in response to data messages from the nodes 31, 31, 41, and 41 to which they are respectively connected.

Node 111 at Phoenix represents a different situation. At the Phoenix node 111, signals are removed and inserted, but the timing of signals is not changed. No optic link is terminated nor is a frame synchronizing signal transmitted from the Phoenix node 111, which is referred to as a branch node. The incoming signal to node 111 from node 21 arrives at T2,11 and has the same timing as the outgoing signal T11A from node 111 to node 61. Similarly, the incoming signal to Phoenix node 111 from Los Angeles node 61, arriving as timing signal T6,11, has the same timing as outgoing signal T11B to node 21. The presence of the Phoenix node 111 does not interfere with the ability of Los Angeles node 61 to adjust its outgoing signal time T6,2 to arrive at Dallas node 21 in frame synchronism with T2. Differences in timing between T2,11A and T6,11B, resulting in different arrival times at node 111 of frames from nodes 21 and 61, respectively, can be compensated for by buffers in series with the communication link 114 to Phoenix communication switch 112.

FIG. 7 is a more detailed block diagram of Dallas node 21 which comprises a photonic switch. The photonic switch comprises an array of photonic crosspoints 200 for switching both directions of traffic for each facility. Node 21 is connected to communication switches 22 and 26 by two-way communication link groups 24 and 28, each shown on FIG. 7 as two one-way communication link groups, 24A and 24B, and 28A and 28B.

Links 24A and 28A comprise a group of links, one per T1 carrier group. Each such link terminates in a separate buffer register within block 270. The output of the appropriate buffer registers of block 270 is converted to serial form and gated under the control of the clock 232, the timing control 256 and signals from processor 250 defining the intervals associated with each register, to photodiode 223. Similarly, links 24B and 28B comprise a group of links, one per T1 carrier group. These links are connected to separate registers within buffer 246.

The serial output of optical detector 244 is converted into parallel form and gated into the appropriate one of these registers of block 246 under the control of timing signals from the clock and signals from processor 250 defining the interval associated with each register. The output of each register is then converted into serial form and transmitted by one of the group of links 24B and 28B to an input to one of communication switches 22 and 26.

The output of buffer block 270 is used as input 29A to drive photodiode 223 connected to crosspoint array 200. The combination of blocks 270 and 223 acts as an electrical/optical converter 291 to convert electrical communication signals to optical communication signals; the combination of blocks 244 and 246 acts as an optical/electrical converter to convert optical communication signals to electrical communication signals. Delay introduced by different registers of buffer block 270 in order to ensure that signals on input 29A are in frame synchronism with other inputs to crosspoint array 200 is controlled by timing control 256 in conjunction with signals from processor 250 defining timing of different signal groups. Buffer block 270 also has a permanently set up signal sequence representing a frame synchronizing signal and a route switching interval signal, so that these signals can be generated at the time indicated by the timing control and clock. The communications between buffer blocks 309 and 313 and link groups 54B and 54A, (FIG. 9), respectively, and between buffer blocks 417 and 415 and link groups 114B and 114A, (FIG. 10), respectively, are similar to the communications between blocks 246 and 270 and link groups (24B and 28B) and (24A and 28A) respectively, as are the communications between these blocks and the associated photodiodes and optical detectors.

The photonic crosspoints in crosspoint array 200 switch optical signals from incoming to outgoing optical bit streams. The incoming optical bit streams to the array are received from optical links and regenerated to adequate signal strength by lightwave regenerators such as 221,222,223, and incoming electrical signals from buffer block 270 are converted into optical signals for input to crosspoint array 200 by photodiode 220. The output signals of the crosspoint array 200 are amplified by lightwave regenerators 240,241, and 242 for driving optical fibers and by optical detector 244 for generating an electrical signal to load buffer block 246. Lightwave regenerators operating in the optical domain are described in S. Kobayashi et al.: "Semiconductor Optical Amplifiers", *IEEE Spectrum*. Vol. 21, no. 5, pp. 26-33, May 1984. Lightwave regenerators operating in the optical-electrical-optical domain are available commercially; for example, a 15E2 lightwave regenerator is manufactured by AT&T Technologies, Inc.

Crosspoint array 200 is a non-blocking rearrangeable switching network which is capable of switching any time slot group of any input to the same time slot group of any output. Crosspoint array 200 comprises six beta elements. Beta elements have been defined in the literature in A. E. Joel: "Permutation Switching Networks", *Bell System Technical Journal,* Vol. 68, No. 5, pp. 813-822 at pp. 813-816, May - June 1968. These beta elements each have two input signals shown on the left and two output signals shown on the right. When the element is in the "off" state, the top input is connected to the top output and the bottom input to the bottom output. When the element is in the "on" state, the top input is connected to the bottom output and the bottom input is connected to the top output (crosswise or diagonal transmission). The beta elements are especially adaptable for use in switching optical signals. Lithium niobate beta elements are described in IEEE Global Telecommunications Conference, 1984, papers 26.2.1: R. C. Alferness: High Speed Optical Switches for Single-Mode Lightwave Communications; and 26.5.1: H. S. Hinton: A Nonblocking Optical Interconnection Network Using Directional Couplers.

Crosspoint array 200 comprises six beta elements 201, 203, 205, 207, 209 and 211 each of which is controlled by crosspoint control 234. The crosspoint array 200 performs switching and transmission of signals from four input optical bit streams to four output optical bit streams. The four inputs are from Atlanta optic fiber 43W (lightwave regenerator 220 for amplifying the output of optical variable delay 281 connected to lightwave regenerator 280 connected to optic fiber 43W), Chicago optic fiber 13S (lightwave regenerator 221), Los Angeles optic fiber 63AE (lightwave regenerator 222), and Dallas communication switches 22 and 26 connected through communication links 24A and 28A to input 29A (photodiode 223). The four output streams go to optical lightwave regenerators 240 (to Chicago optic fiber 13N), 241 (to Atlanta optic fiber 43E), and 242 (to Los Angeles optic fiber 63AW), and to optical detector 244 (to output 29B to communication links 24B and 28B to Dallas communication switches 22 and 26). When all the six beta elements are off, transmission is from 223, 222, 220, 221, respectively, to 240, 241, 242 and 244, respectively. When beta elements 201 and 203 are on, transmission is from 222, 223, 221, and 220 to 240, 241, 242 and 244, respectively. When beta elements 205, 207, 209 and 211 are on, transmission is from 220, 221, 223, 222 to 240, 241, 242 and 244, respectively. An examination of these path configurations show that they are symmetrical, i.e., that when, for example, an incoming signal from Los Angeles is transmitted to an outgoing signal to Atlanta, then an incoming signal from Atlanta is concurrently transmitted to an outgoing signal to Los Angeles. In the Dallas photonic switch with the allocation of time slot groups as indicated in FIG. 5, all beta elements are off during time slot group intervals 20-31 and during the frame synchronizing signal interval 0, beta elements 201 and 203 are on during time slot group intervals 1-3, 9-14 and 18-19, and beta elements 205, 207, 209 and 211 are on during time slot group intervals 4-8 and 15-17. Further, rearrangement of paths for such a photonic switch for setting up symmetrical paths between only four input and four output terminals will not interfere with existing paths, since any change in an existing path configuration necessarily requires that the paths to all terminals be switched.

The same type of crosspoint array as crosspoint array 200 can also be used in node 11. Provided that information signals in the bit streams from and to nodes 71 and 81, and from and to nodes 91 and 101, do not overlap except when signals are transmitted between these pairs of nodes, the same general crosspoint array can be used in nodes 31 and 41. The only additions required are a beta element with input signals from optic fibers from nodes 71 and 81, or 91 and 101, inserted to combine these signals into one input signal to each array, a second beta element inserted in each array with input from one output signal of the array and output connected to optic fibers to nodes 71 and 81, or 91 and 101, respectively, with the second output of the first beta element being connected to the second input of the second beta element to supply one path between the node pairs.

Alternatively, the non-blocking without rearrangement type of photonic crosspoint array described in the previously cited article by Hinton could also be used. Such an array comprises a rectangular array of beta elements arranged so that pairs of terminals of one diagonal of each beta element are serially connected in a horizontal row to input signals, and pairs of terminals from the other diagonal of each beta element are serially connected in a vertical column to generate output signals. All beta elements of this rectangular array are "on" (crosswise or diagonal transmission) except the elements at the intersection of a row and a column to be interconnected. Use of such an array guarantees that no switch of one path interferes with the concurrent transmission of signals on another path. This is not a problem in any of the photonic switches of the exemplary embodiment provided that information signals in the bit streams from nodes 71 and 81, or 91 and 101 do not overlap except when signals are transmitted between these pairs of nodes. However, a non-blocking non-rearrangeable photonic network, such as that described in the Hinton paper, would be desirable if substantial quantities of one-way traffic needed to be switched, or if larger photonic switches were required, since they permit free use of multiple time slot group intervals of the type illustrated in FIG. 4 as triple time slot group 3004.

The Dallas node 21 derives its clock from the incoming signal from Chicago node 11. This is accomplished by connecting frame synchronizing detector 230 to the output of optical detector 244 which receives its input from optical link 13, connected to Chicago node 11, when beta elements 203 and 209 are in the off state. Frame synchronizing detector 230 detects the incoming frame synchronizing signal which signal is sent to clock 232. Clock 232 generates all needed clock signals from this frame synchronizing signal. The output of the clock 232, in conjunction with control signals from processor 250 defining which crosspoints are to be operated during which intervals, is used to control crosspoint control unit 234. Crosspoint control unit 234 has outputs to each of the beta elements in the crosspoint array to place each beta element in the "on" or "off" state. The clock signals which are used for the crosspoint control have a duration of one time slot group interval and are logically combined, under the control of signals from processor 250, to generate longer timing signals for maintaining an element in the "on" state for several sequential time slot group intervals. In this switch, all the beta elements are in the "off" state during the frame synchronizing signal in order to connect the frame synchronizing signal from input 13S (lightwave regenerator 221) to frame synchronizing detector 230 during the frame synchronizing signal interval.

Timing signals from other input signals, such as the signal generated by lightwave regenerator 222 which amplifies the signal from Los Angeles node 61 and Phoenix node 111, are not directly used for timing within node 21 since crosspoint array 200 switches signals among input optical bit streams that are frame synchronous, and uses a clock derived from only one input. However, it is necessary to ensure that signals which are initially frame synchronous but are drifting away from synchronism are brought back into synchronism. Route switching interval detector 258 is connected to buffer block 246 which receives the output of optical detector 244, including signals representing route signal switching intervals. The digital signal pattern and lagging edge time of such route switching intervals is detected by route switch interval detector 258. A comparator 260 is used to compare the time of the lagging edge of route switching interval signals as they are detected by route switching interval detector 258 with the corresponding route switch interval clock signal generated by the clock 232 (derived from the master frame synchronizing signal detected by frame sync detector 230). If the comparator recognizes a sufficiently large difference, a signal is sent to processor 250 which causes a message to be generated for transmission via data transmitter 254 and communication switch 22 to the node that transmitted a given route switch interval signal to cause that node to advance or delay its time frame. In this embodiment these and other internodal messages are transmitted using the common channel signaling (CCS) system interconnecting the communication switches including communication switch 22; alternative data communication networks could also be used. Node 21 includes transmitter 254 and receiver 252 connected via a data channel to communication switch 22 for communicating over the CCS system; other nodes are similarly equipped.

A variable optical delay 43A, previously discussed, is inserted between the signal coming from optic fiber 43W and the photonic crosspoint array 200. The input signal from optic fiber 43W is amplified by lightwave regenerator 280 whose output appears at signal point 282 as in input to variable delay 281. The output 283 of variable delay 281 is connected to lightwave regenerator 220 connected to photonic crosspoint array 200.

Figure 8:
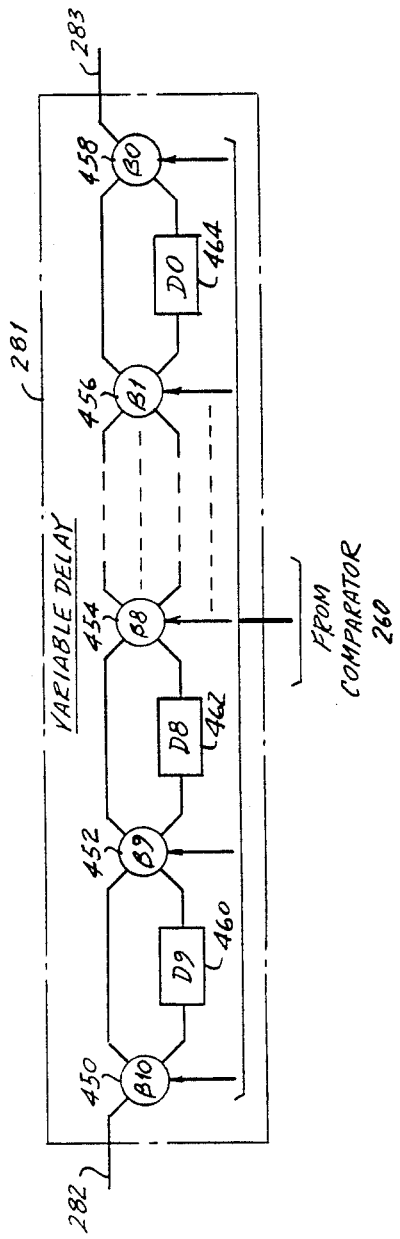
FIG. 8 is a diagram of a variable optical delay line.

FIG. 8 shows details of variable delay box 281. The variable delay includes ten delay elements, D9(460),D8(462), . . . , D0(464). These delay elements are optical delay elements such as an appropriate length of optic fiber for delaying an optical signal. D9 inserts approximately one-half the maximum required delay, D8 inserts half the delay of D9, . . . , and D0 inserts half the delay of D1 or 1/512 of the delay of D9. The delay elements are interconnected by beta elements, beta 10(450), beta 9(452), beta 8(454), . . . , beta 1(456), beta 0(458), for either inserting the associated next delay or for bypassing that delay. For example, if beta element 10(450) is in the "off" state, the incoming signal from lead 282 will bypass delay D9(460) and go directly to beta element 9(452); conversely if beta element 10 is in the "on" state, then the signal from path 282 will be transmitted through delay element D9 to beta element 9. A delay element will be bypassed if an even number of preceding beta elements are in the "on" state, and will be inserted if an odd number of previous beta elements are in the "on" state. The final beta element, beta 0, must be controlled so that an even number of beta elements are in the "off" state in order to transmit the signal to path 283. Alternatively, variable delay could be inserted using well-known electrical delay systems by converting the optical signal into an electrical signal, delaying the electrical signal through a variable delay buffer, and reconverting the delayed electrical signal into an optical signal to serve as an input to crosspoint array 200.

The maximum required delay for variable delay buffer 281 is approximately one frame or 125 microseconds. By using ten delay stages as described above, the delay can be adjusted to within 125 microseconds divided by 1024 or 0.122 microseconds. This is about one-tenth the length of the route switching interval. Comparator 260 which controls beta elements 450,452,454, . . . , 456,458, compares the time of occurrence of route switching intervals from the delayed signal, switched from input 220 to output 244 of photonic crosspoint array 200, with the basic clock time as derived from the frame synchronism signal; this comparison is used to adjust the amount of delay which is to be inserted by variable delay unit 43A.

Figure 9:
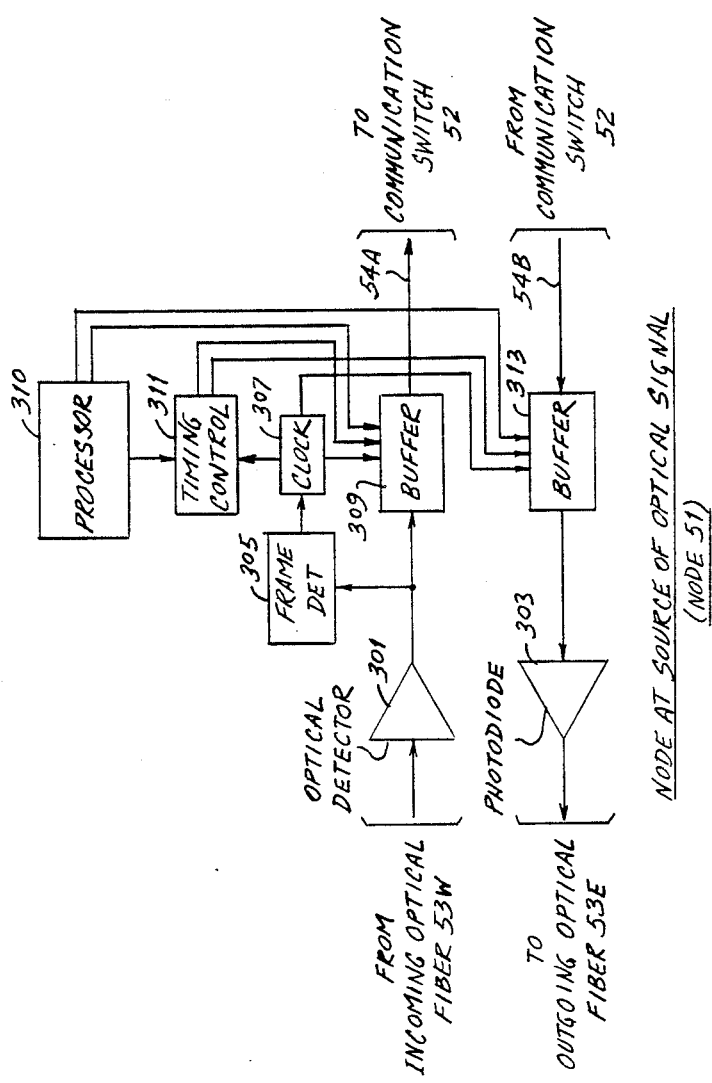
FIGS. 9 and 10 are block diagrams of a node at the source or destination of an optical signal, and of a branch node.

FIG. 9 shows how the timing is arranged in San Francisco node 51. Node 51 is the source of an optical signal, but performs no switching of signals between optical fibers. In such a node, the signal coming into the node from an incoming optical fiber need not be frame synchronized with a signal going out on an outgoing optical fiber. Thus, timing of the outgoing signal can be adjusted using an electrical delay buffer whose delay is adjusted in response to data messages received from the next photonic switch which switches the optical signals transmitted on the outgoing optical fiber. The delay of the outgoing optical signal is adjusted so that each time frame will arrive in frame synchronism with the timing at that photonic switch.

This is illustrated in FIG. 9 which shows incoming optical fiber 53W connected to an optical detector 301 whose signal is transmitted to a buffer 309 for subsequent transmission to communication switch 52. A frame synchronizing detector 305 is used to drive a clock 307 so that node 51 will be synchronized to the timing derived from the incoming signal. Outgoing signals from communication switch 52 are used to drive photodiode 303 which is connected to outgoing optical fiber 53E. These outgoing signals are sent via variable delay buffer 313. The delay inserted by buffer 313 is adjusted in accordance with signals from timing control circuit 311 and processor 310 to ensure that the outgoing signal from node 51 arrives at the connected photonic switch of node 11 in frame synchronism with the frame signals defined by the clock of node 11. The amount of this delay and the corresponding timing of a frame synchronizing signal to optical fiber 53E is based on data messages received by the processor 310 from the processor of node 11 (not shown but similar to processor 250 of node 21) indicating whether the timing from node 51 needs to be adjusted and if so in which direction.

Figure 10:
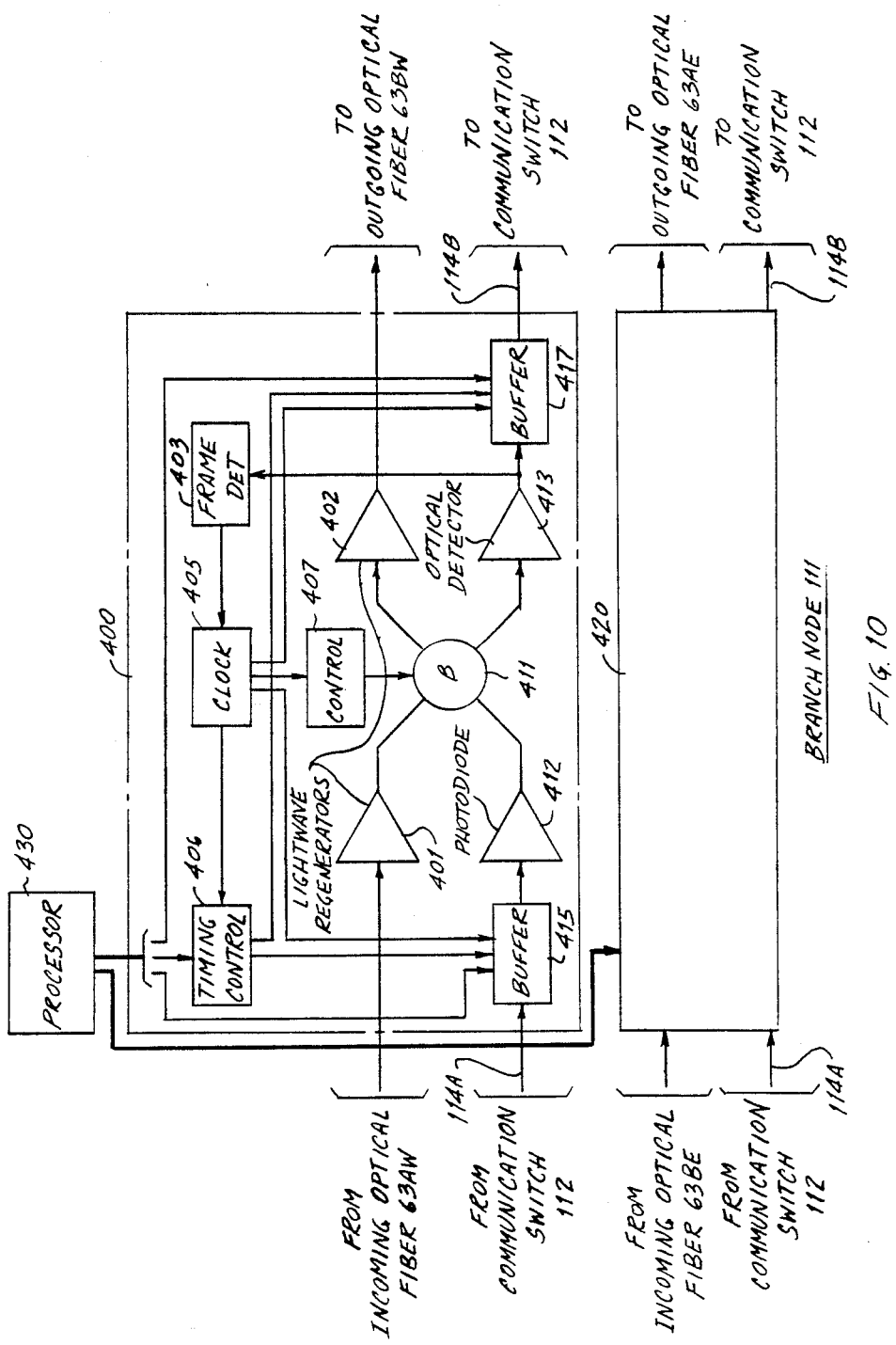

Phoenix node 111, shown in FIG. 10, is a specialized node which is neither the source of synchronizing signals to an optical fiber, nor a place where optical signals are switched from one fiber to another. Node 111 a branch node where signal groups can be received and transmitted, but where no outgoing frame synchronizing signal is generated. The signals in the two outgoing directions are not frame synchronized since the frame synchronism control for each of these signals is at a different location. The frame synchronism control for the signal from Dallas is under the control of the Dallas node 21 whereas the frame synchronism control of the signal from Los Angeles is under the control of the Los Angeles node 61. One direction of transmission for branch node 111 is illustrated in block 400 which includes a lightwave regenerator 401 connected to incoming optical fiber 63AW, a frame detector 403 for detecting the beginning of a time frame, a clock 405 driven by the frame detector, and a control 407 driven by outputs of the clock for controlling a beta element 411. Incoming electrical signals from communication switch 112 are stored in a buffer 415 and transmitted thence to photodiode 412. These electrical signals are delayed in the buffer 415 so that they can be inserted into the optical bit stream transmitted on outgoing optical fiber 63BW at the allocated time. The delay is controlled by inputs from the timing control circuit 406 and from processor 430. Processor 430 receives messages from processor 250 (FIG. 2) which allots time slot groups to each of the nodes. Note that since node 111 does not change any timing, it does not respond to delay change request messages from processor 250 of node 21; of the nodes on optical link 63, only node 61 responds to such messages from node 21.

When beta element 411 is off, signals from incoming optical fiber 63AW are sent to lightwave regenerator 402, connected to outgoing optical fiber 63BW. When beta element 411 is on, the output of photodiode 412 is transmitted to lightwave regenerator 402 for transmission to the outgoing optical fiber. Also, when beta element 411 is on, the output of the incoming signal lightwave regenerator 401 is transmitted via optical detector 413 to buffer 417 for subsequent transmission to the communication switch 112 associated with Phoenix branch node 111, and the output of photodiode 412, representing signals from communication switch 112, is transmitted to lightwave regenerator 402, for transmission over outgoing optical fiber 63BW.

Block 420 controls transmission through the Phoenix branch node 111 in the opposite direction, controls the insertion of signals to outgoing optical fiber 63AE from communication switch 112 and the transmission of signals received from incoming optical fiber 63BE to communication switch 112. Block 420 is identical to block 400 with one exception; even though a separate frame detector and clock is required for controlling the corresponding beta element of box 420, only one of the clocks drives the clock of the communication switch 112 associated with the branch node 111. Blocks 400 and 420 are both controlled by signals from processor 430.

Figure 11:
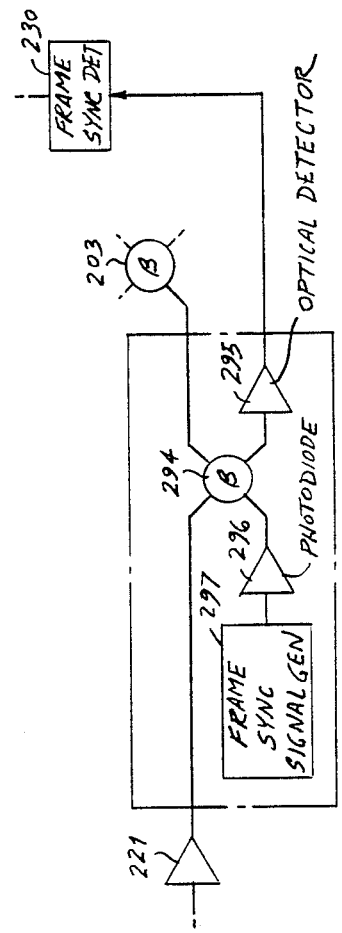
FIG. 11 is a block diagram of an alternative frame synchronizing detection circuit for the node of FIG. 6.

FIG. 11 shows an alternative arrangement which may be used to detect signals required for synchronizing input signals to photonic switches. A beta element 294 is inserted in series between lightwave regenerator 221 (FIG. 7) from optic fiber 13S and the first stage beta element 203 of photonic crosspoint array 200. The second output of beta element 294 is connected to a photodetector 295. The output of photodetector 295 is then used as the input to frame synchronizing detector 230 (FIG. 7) for detecting the frame synchronizing signal timing. A frame synchronizing signal generator 297 is connected via photodiode 296 to the other input of beta element 294 in order to transmit a frame synchronizing signal to beta element 203, thence to the output of the photonic crosspoint array 200. Similar circuits could be connected to other inputs to photonic crosspoint array 200. Beta elements of such similar circuits, such as beta element 294, would be in the "on" state during the frame synchronizing interval. Synchronizing detectors such as 230 can be used to detect any drift in the timing of the frame synchronizing signal of any input to the photonic crosspoint array 200 directly, instead of using the arrangement of FIG. 7 wherein drift of frame synchronizing signals is detected by detecting the drift of corresponding route switching interval signals.

While most of this description has dealt with switching of digital voice signals in two-way channels, the basic principles of this invention can also be applied to switching other types of signals. For example, if a video signal, requiring about as many digital information bits per second as 100 voice channels, is to be switched, such a video signal can be transmitted using three or four adjacent time intervals. If the video signal is a one-way signal, then the three or four time intervals for transmission in the other direction are available for other signals.

While the above discussion has been devoted to cases in which the optical sources and destinations are connected to communication switches, it is also possible to have a private branch exchange connected to a source or destination. It is necessary only that the optical signals be frame synchronized, either at the point where the optical stream is generated or at the point where the optical stream enters a photonic switch.

The above description is considered to be only an illustrative embodiment of the invention. For example, other alternative techniques for achieving frame synchronism among different nodes and communication switches, such as those used in the North American network, could also be used. It is to be understood that various and numerous other arrangements may be devised by one skilled in the art without departing from the spirit and scope of the invention. The invention is thus limited only as defined in the accompanying claims.

What is claimed is:

1. An optical communication arrangement comprising:
   a first and a second optical bit stream each comprising periodic frames of signal groups, each said signal group comprising a plurality of time slots each having digital information bits and each said signal group being separated in time by a route switching interval;
   means for alllocating each said signal group for communication of said plurality of time slots to a predetermined destination;
   photonic switch means, controlled during each said route switching interval, for switching each of the allocated signal groups in an optical domain to its respective allocated predetermined destination;
   synchronizing means for frame synchronizing said first and said second optical bit streams for switching by said photonic switch means.

2. The optical communication arrangement of claim 1 wherein one of said predetermined destinations comprises optical/electrical conversion means for converting the optical signals corresponding to a signal group allocated for communication of said plurality of time slots to said one predetermined destination to corresponding destination electrical signals for said one predetermined destination.

3. The optical communication arrangement of claim 1 wherein said means for allocating comprises processor means for allocating each of said signal groups.

4. The optical communication arrangement of claim 1 further comprising a branch node for inserting and removing a proper subset of said signal groups from said optical bit streams.

5. The optical communication arrangement of claim 1 wherein each periodic frame comprises a synchronizing signal, a plurality of said signal groups, and route switching intervals between successive ones of said signal groups.

6. The optical communication arrangement of claim 1 further comprising:
   communication sources for generating electrical communication signals; and
   electrical/optical conversion means for converting said electrical communication signals into optical signals of said optical bit streams.

7. The optical communication arrangement of claim 6 wherein said electrical/optical conversion means further comprise means for introducing adjustable delay prior to generating said optical signals.

8. The optical communication arrangement of claim 1 wherein said synchronizing means further comprises clock means for defining said route switching intervals and wherein said photonic switch means derives a clock signal for synchronizing said clock means from said optical bit streams.

9. The optical communication arrangement of claim 8 wherein said means for synchronizing comprises an adjustable optical delay means.

10. The optical communication arrangement of claim 1 further comprising a source communication system, comprising:
    communication sources for generating electrical communication signals; and
    electrical/optical conversion means for converting said electrical commuication signals into signals of said optical bit streams.

11. The optical communication arrangement of claim 10 wherein said electrical/optical conversion means comprises means for adjusting the frame timing of said optical bit streams.

12. The optical communication arrangement of claim 11, further comprising:
    clock means for defining route switching intervals for said photonic switch means;
    means for measuring differences between route switching interval times defined by said clock means and route switching interval times of said optical bit streams;
    processor means for generating data messages representing said differences;
    means for transmitting said data messages to said source communication system;
    said source communication system responsive to reception of said data messages for adjusting the frame timing of said optical bit streams.

13. The optical communication arrangement of claim 1 wherein one of said predetermined destinations comprises an optical transmission system.

14. The optical communication arrangement of claim 13 further comprising an other photonic switch means wherein said optical transmission system interconnects said photonic switch means and said other photonic switch means.

15. The optical communication arrangement of claim 13 further comprising optical/electrical conversion means for generating electrical information signals wherein said optical transmission system interconnects said photonic switch means and said optical/electrical conversion means.

16. An optical communication arrangement comprising:
    an optical bit stream comprising periodic frames of signal groups, each said signal group comrising a plurality of time slots each having digital information bits and each said signal group being separate in time by a route switching interval;
    processor means for allocating each said signal group for communication of said plurality of time slots to a predetermined destination; and photonic switch means, controlled during each said route switching interval, for switching each of the allocated signal groups in an optical domain to its respective allocated predetermined destination;

a source communication system responsive to communication requests for generating said optical bit stream;

said source communication system comprising processor means for measuring the volume of communications of said communication requests and for generating data messages representing said volume of communications;

data transmission means for transmitting said data messages to said processor means for allocating;

said processor means for allocating responsive to said data messages for changing said allocations to reflect the volume of communications represented by said data messages.

17. An optical communication arrangement comprising:

an optical bit stream comprising frame synchronizing signals and periodic frames of signal groups, each said signal group comprising a plurality of time slots each having digital information bits and each said signal group being separated in time by a route switching interval;

a branch node for inserting and removing a proper subset of said signal groups from said optical bit stream;

means for allocating each said signal group for communication of said plurality of time slots to a predetermined destination; and photonic switch means, controlled during each said route switching interval, for switching each of the allocated signal groups in an optical domain to its respective allocated predetermined destination wherein said optical bit stream comprises frame synchronizing signals, and said branch node comprises:

means for detecting said frame synchronizing signals;

clock means responsive to said means for detecting said frame synchronizing signals; and adjustable delay means responsive to said clock means for adjustably delaying signals to be inserted into said optical stream.

18. An optical communication arrangement comprising:

a plurality of optical bit streams each comprising periodic frames of signal groups, each frame comprising a frame synchronizing signal, each said signal group comprising a plurality of time slots each having digital information bits and each said signal group being separated in time by a route switching interval;

means for allocating each said signal group for communication of said plurality of time slots to a predetermined destination;

means for frame synchronizing said plurality of optical bit streams; and photonic switch means controlled during each said route switching interval for concurrently switching each of the allocated signal groups of each of said frame synchronized plurality of optical bit streams in an optical domain to the respective predetermined destination.

19. The optical communication arrangement of claim 18 wherein one of said predetermined destinations comprises optical/electrical conversion means for converting the optical signals corrsponding to a signal group allocated for communication of said plurality of time slots to said one predetermined destination to corresponding destination electrical signals for said one predetermined destination.

20. The optical communication arrangement of claim 19 further comprising a source communication system, comprising:

communication sources for generating electrical communication signals; and electrical/optical conversion means for converting said electrical communication signals into optical signals of one of said optical bit streams.

21. An optical communication arrangement comprising:

a plurality of optical bit streams each comprising periodic frames of signal gorups, each frame comprising a frame synchronizing signal, each said signal group comprising a plurality of time slots each having digital information bits and each said signal group being separated in time by a route switching interval;

means for allocating each said signal group for communication of said plurality of time slots to a predetermined destination;

means for frame synchronizing said plurality of optical bit streams;

photonic switch means, controlled during each said route switching interval, for switching each of the allocated signal groups of each of said frame synchronized plurality of optical bit streams in an optical domain to its respective allocated predetermined destination; and a source communication system, comprising:

communication sources for generating electrical communication signals; and electrical/optical conversion means for converting said electrical communication signals into optical signals of one of said optical bit streams;

wherein one of said predetermined destinations comprises optical/electrical conversion means for converting the optical signals corresponding to a signal group allocated for communication of said plurality of time slots to said one predetermined destination to corresponding destination electrical signals for said one predetermined destination;

wherein said electrical/optical conversion means further comprises means for introducing adjustable delay prior to generating said optical signals.

22. The optical communication arrangement of claim 21 wherein said means for allocating comprises processor means for allocating each of said signal groups.

23. The optical communication arrangement of claim 21 wherein one of said predetermined destinations comprises an optical transmission system.

24. The optical communication arrangement of claim 21 wherein each of a plurality of said signal groups comprises digital information bits for a plurality of individual communications, and wherein a plurality of said predetermined destinations each comprises a communication switch for separately routing individual communications included in a signal group.

25. The optical communication arrangement of claim 21 wherein said photonic switch means comprises clock means for defining said perodic frames and wherein said means for introducing adjustable delay means introduces an amount of delay such that said delayed optical signals appear at said photonic switch means in frame synchronism with said clock.

26. The optical communication arrangement of claim 25 wherein said clock means define said route switching intervals for said photonic switch means.

27. The optical communication arrangement of claim 26 further comprising adjustable optical delay means coupled to said photonic switch means for adjusting an incoming optical signal connected to said adjustable optical delay means to be frame synchronized with said clock of said photonic switch means.

28. The optical communication arrangement of claim 26 wherein said means of adjusting comprises:
  means for measuring differences between route switching intervals defined by said clock means and route switching intervals of said optical bit streams;
  processor means for generating data messages representing said diffrneces;
  means for transmitting said data messages to said source communication systems;
  said source communication systems responsive to reception of said data messages for adjusting the frame timing of said optical bit stream.

29. An optical communication arrangement comprising:
  a plurality of optical bit streams each comprising periodic frames of signal groups, each frame comprising a frame synchronizing signal, each said signal group comprising a plurality of time slots each having digital information bits and each said signal group being separate in time by a route switching interval;
  processor means for allocating each said signal group for communication of said plurality of time slots to a predetermined destination;
  means for frame synchronizing said plurality of optical bit streams;
  photonic switch means, controlled during each said route switching interval, for switching each of the allocated signal groups of each of said frame synchronized plurality of optical bit streams in an optical domain to its respective allocated predetermined destination;
  a communication switching system responsive to communication requests for generating said optical bit stream;
  said communication switching comprising processor means for measuring the volume of communications of said communication requests and for generating data messages representing said volume communications;
  data transmission means for transmitting said data messages to said processor means for allocating; and
  said processor means for allocating responsive to said data mesages for changing said allocations to reflect the volume of communications represented by said data messages.

30. A photonic transmission communication network comprising:
  a plurality of first nodes;
  a second node comprising photonic switch means;
  a plurality of optical links for transmitting optical signals between each of said first nodes and said second node;
  each of said first nodes comprising electrical/optical conversion means and optical/electrical conversion means connected to one end of one of said plurality of optical links for connection respectively to a plurality of sources of and destinations for electrical digital communication signals;
  said photonic switch means connected to a plurality of said optical links and comprising means for switching optical signals between pairs of said plurality of said connected optical links;
  the optical signals on each of said optical links being grouped in time frames, each frame comprising a plurality of signal groups of adjacent time slots for carrying information signals between a plurality of communication sources and destinations, each said signal group separated in time by a route switching interval; and
  means for frame synchronizing the incoming optical signals on the plurality of optical links connected to said optical switch means;
  said information signals of each of said groups of time slots being switched concurrently by said photonic switch means and being communicated between said elctrical/optical conversion means and optical/electrical conversion means of the same pair of first nodes.

31. A photonic transmission communication network comprising:
  a plurality of first nodes;
  a second node comprising photonic switch means;
  a plurality of optical links for transmitting optical signals between each of said first nodes and said second node;
  each of said first nodes comprises electrical/optical conversion means and optical/electrical conversion means connected to one end of one of said plurality of optical links for connection respectively to a plurality of sources of and destinations for electrical digital communication signals;
  said photonic switch means connected to a plurality of said optical links and comprising means for switching optical signals between pairs of said plurality of connected said optical links; and
  the optical signals on each of said optical links being grouped in time frames, each frame comprising a plurality of signal groups of adjacent time slots for carrying information signals between a plurality of communication sources and destinations, each said signal group separated in time by a switching inteval, and said information signals of each of said groups of time slots being communicated between said electrical/optical conversion means and optical/electrical conversion means of the same pair of first nodes;
  wherein said second node further comprises electrical/optical conversion means and optical/electrical conversion means for connection respectively to a plurality of sources of and destinations for electrical digital communication signals;
  wherein said photonic switch means further switches signals between ones of said plurality of optical links and said optical/electrical conversion means of said second node; and
  wherein the signals of each of said signal groups are sent between the electrical/optical conversion means of one of said first and second nodes and the optical/electrical conversion means of another of said first and second nodes.

32. The network of claim 31 wherein said optical/electrical conversion means of each of said first nodes comprises a buffer for transmission of electrical digital communication signals for that node to said destinations.

33. The network of claim 31 wherein signals from one of said electrical/optical conversion means to one of said optical/electrical conversion means remain in the same position in time within a frame on each of the optical links over which said signals from said one of said elctrical/optical conversion means are transmitted.

34. The network of claim 31 wherein said photonic switch means comprises an array of photonic crosspoints, and further comprising means for frame synchronizing the signals entering said array of crosspoints.

35. The network of claim 34 wherein one of said nodes comprises a master clock, and wherein the timing of the master clock is distributed to other nodes by frame timing signals carried by ones of said optical links.

36. The network of claim 35 wherein said means for frame synchronizing comprise means for detecting said route switching intervals, means for generating interval timing signals from said distributed frame timing signals, and for comparing the time of occurrence of said detected route switching intervals with the time of occurrence of said generated interval timing signals.

37. A photonic transmission communication network comprising:
 a plurality of first nodes;
 a second node comprising photonic switch means;
 a plurality of optical links for transmitting optical signals between each of said first nodes and said second node;
 each of said first nodes comprises electrical/optical conversion means and optical/electrical conversion means connected to one end of said plurality of optical links for connection respectively to a plurality of sources of and destinations for electrical digital communication signals;
 said photonic switch means connected to a plurality of said optical links and comprising means for switching optical signals between pairs of said plurality of connected said optical links; and
 the optical signals on each of said optical links being grouped in time frames, each frame comprising a plurality of signal groups of adjacent time slots for carrying information signals between a plurality of communication sources and destinations, each said signal group separated in time by a route switching interval, and said information signals of each of said groups of time slots being communicated between said electrical/optical conversion means and optical/electrical conversion means of the same pair of first nodes;
 wherein one of said nodes comprises means for assigning the route associated with each of the plurality of signal groups of each of said plurality of optical links.

38. The network of claim 37 further comprising a branch point node for removing a proper subset of the optical signals of one of said optical links from said optical link and for inserting a proper subset of the optical signals of said one of said optical links into said optical link.

39. The network of claim 37 wherein different subsets of the plurality of sources and destinations connectable to one of said first nodes are connected to different ones of two communication switches.

40. The network of claim 39 wherein said one first node comprises a buffer for accepting the output of said optical/electrical conversion means of said one first node for connection to communication links to each of said communication switches.

41. The network of claim 37, further comprising an additional second node comprising photonic switch means, wherein said plurality of optical links comprises a link between said second node and said additional second node wherein at least one of said second nodes comprises means for adjustably delaying the signal received from one of said plurality of optical links.

42. The network of claim 41 wherein said means for adjustably delaying the signal comprises adjustable optical delay means for adjustably delaying an optical signal in the optical domain.

43. The network of claim 37 further comprising means for frame synchronizing all inputs to said photonic switch of said second node.

44. The network of claim 43 wherein said second node comprises means for measuring frame synchronism offset for an optical signal received from one of said first nodes by said second node and for generating and transmitting a data message representing said measured frame offset for transmission to said one of said first nodes.

45. The network of claim 44 wherein the electrical/optical conversion means of said one of said first nodes further comprises a buffer for adjustably delaying conversion of electrical signals to optical signal from said one first node in response to reception from said second node of said data message representing said measured frame offset.

46. Photonic switch apparatus comprising:
 a plurality of optical paths each carrying an optical signal stream comprising periodic frames of signal groups interleaved between control intervals, each said signal group comprising a plurality of time slots each having digital information bits and each signal group, said plurality of optical paths comprising a plurality of optical incoming paths and a plurality of optical outgoing paths;
 synchronizing means for frame synchronizing signals on said plurality of optical incoming paths;
 photonic switch means for establishing optical domain switchable connections from said plurality of optical incoming paths to said plurality of optical outgoing paths; and
 control means for operating said photonic switch only during said control intervals to maintain a plurality of switched connections therethrough for communicating in an optical domain successively received signal groups between specified ones of said plurality of input and output paths and for concurrently switching such connections during said control intervals.

47. The photonic switching apparatus of claim 46 wherein said control means comprises processor means for specifying said switched connections.

48. The photonic switch apparatus of claim 46 further comprising processor means for allocating signal groups on each of said plurality of optical paths.

49. A communication arrangement for interconnecting a plurality of signal sources and signal destinations comprising:
 a plurality of optical paths each carrying an optical signal stream comprising periodic signal groups of optical information time slots with each said group being separated in time by a route switching interval;

means for allocating each of said groups of time slots for communication of optical information signals therein to a route from one of said signal sources to one of said signal destinations;

photonic switch means for switching, in an optical domain, information signals in time slots of each of the allocated groups, said photonic switch means operated during said route switching intervals to maintain switched connections therethrough during each of said groups of time slots for the communication of information signals in said time slots of each of said allocated groups over said route from source to destination and for concurrently switching such connections during said control intervals; and means for synchronizing the optical streams entering said photonic switch means to within an interval less than said route switching interval.

50. An optical communication arrangement comprising:

a first and a second optical stream each comprising periodic information signals comprising groups of optical information time slots each of said groups being separated in time by a route switching interval;

photonic switch means for switching information signals in said optical streams in an optical domain and in said groups of time slots from a plurality of sources to a plurality of destinations without any conversion of optical information signals to an electrical domain in its said communication from said source to said destination, said photonic switch means being operable during said route switching interval to maintain switch connections therethrough during said groups of time slots and for concurrently switching such connections during said control intervals;

means for synchronizing said optical streams entering said photonic switch means to within an interval less than said route switching interval; and means for allocating each of said groups of time slots for a communication of optical information signals therein between a predetermined source and a predetermined destination.

51. Photonic switching apparatus comprising:

photonic switch means for establishing optical domain switchable connections from a plurality of incoming paths for carrying incoming optical signal streams to a plurality of outgoing paths for carrying outgoing optical signal streams, each of said incoming optical signal streams comprising periodic frames of signal groups, each said signal group comprising a plurality of time slots each having digital information bits and each said signal group being separated in time by a route switching interval;

means for frame synchronizing said optical streams entering said photonic switch means to within an interval less than said route switching interval;

processor means for generating control signals to determine the switched connections to be established in said photonic switch means; and control means responsive to said control signals for controlling during said route switching intervals the concurrent switching of connections of said photonic switch means.

52. A method of transmitting information signals in an optical communication network comprising the steps of:

allocating information signals for communication of a plurality of time slots to each of a plurality of predetermined destinations to each of a plurality of periodic signal groups;

generating first and second optical bit streams each comprising periodic frames of ones of said plurality of periodic signal groups and a synchronizing signal for each frame, each said group being separated in time by a route switching interval;

frame synchronizing said first and said second optical bit streams; and concurrently switching in an optical domain during said route switching intervals individual ones of said allocated plurality of periodic signal groups to their respective allocated predetermined destinations.

53. A method for transmitting information signals in an optical communication network comprising the steps of:

allocating information signals for communication of a plurality of time slots to each of a plurality predetermined destinations to each of a plurality of periodic signal groups;

generating first and second optical bit streams each comprising periodic frames of said plurality of periodic signal groups and a synchronizing signal for each frame, each said group being separated in time by a switching interval;

frame synchronizing said first and said second optical bit streams;

switching in an optical domain individual ones of said allocated plurality of periodic signal groups to their respective allocated predetermined destinations;

converting at least one of said optical bit streams into an electrical signal;

adjustably delaying said electrical signal;

reconverting said adjustably delayed electrical signal to an optical bit stream.

54. The method of claim 53 further comprising the step of transmitting at least one of said optical bit streams over an optical communication link.

55. The method of claim 53 wherein one of said predetermined destinations comprises optical/electrical conversion means and wherein said switching step further comprises the steps of:

switching one of said allocated plurality of periodic signal groups to said optical/electrical conversion means; and converting said one of said plurality of periodic signal groups to an electrical signal.

56. The method of claim 53 wherein said synchronizing step comprises the steps of:

generating a clock signal defining said periodic frames; and synchronizing said optical bit streams to said clock signal.

57. The method of claim 53 wherein said synchronizing step further comprises the steps of:

receiving a data message representing synchronization information; and adjustably delaying one of said generated optical bit stream responsive to receipt of said synchronizing information.

58. The method of claim 53 wherein said allocating step comprises the step of receiving data mesasges representing traffic data from a plurality of nodes of a commuication network; and allocating signal groups responsive to said received messages.

59. The method of claim 53 wherein said switching step is executed under control of said allocating step and independent of control by said signals of said optical bit stream.

60. A method of transmitting information signals in an optical communication network comprising the steps of:

allocating information signals for communication of a plurality of time slots to each of a plurality predetermined destinations to each of a plurality of periodic signal groups;

generating first and second optical bit streams each comprising periodic frames of said plurality of periodic signal groups and a synchronizing signal for each frame, each said group being separated in time by a switching interval;

frame synchronizing said first and said second optical bit streams;

switching in an optical domain individual ones of said allocated plurality of periodic signal groups to the respective predetermined destination;

wherein said synchronizing step further comprises the step of deriving a clock signal from said second optical bit stream; and synchronizing said first optical bit stream to said derived clock.

61. The method of claim 60 wherein said synchronizing step comprises the step of delaying said optical bit streams through the use of adjustable optical delay.

62. The method of claim 60 wherein said step of synchronizing said optical bit streams to said derived clock comprises the steps of:

generating route switching interval times from said clock signal; and comparing said route switching interval time generated from said clock signal with route switching interval times of said optical bit streams.

* * * * *

UNITED STATES PATENT AND TRADEMARK OFFICE
CERTIFICATE OF CORRECTION

PATENT NO.   : 4,736,462
DATED        : April 5, 1988
INVENTOR(S)  : Amos E. Joel, Jr.

It is certified that error appears in the above-identified patent and that said Letters Patent is hereby corrected as shown below:

Column 24, claim 16, line 62, change "comrising" to --comprising--.
Column 24, claim 16, line 64, change "separate" to --separated--.
Column 26, claim 19, line 1, change "corrsponding" to --corresponding--.
Column 26, claim 21, line 17, change "gorups" to --groups--.
Column 27, claim 28, line 19, change "differneces" to --differences--.
Column 27, claim 29, line 32, change "separate" to --separated--.
Column 27, claim 29, line 48, after "switching" insert --system--.
Column 27, claim 29, line 51, after "volume" insert --of--.
Column 28, claim 30, line 22, change "elctrical" to --electrical--.
Column 29, claim 33, line 9, change "elctrical" to --electrical--.
Column 32, claim 53, line 20, change "for" to --of--.

Signed and Sealed this

First Day of November, 1988

Attest:

DONALD J. QUIGG

*Attesting Officer*           Commissioner of Patents and Trademarks